(12) United States Patent
Morisawa et al.

(10) Patent No.: US 6,205,379 B1
(45) Date of Patent: Mar. 20, 2001

(54) CONTROLLER FOR HYBRID VEHICLE WHEREIN ONE AND THE OTHER OF FRONT AND REAR WHEELS ARE RESPECTIVELY DRIVEN BY ENGINE AND ELECTRIC MOTOR

(75) Inventors: Kunio Morisawa; Eiji Ichioka; Tsuyoshi Mikami, all of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/374,209

(22) Filed: Aug. 12, 1999

(30) Foreign Application Priority Data

Sep. 4, 1998 (JP) .................................................. 10-251642
Sep. 4, 1998 (JP) .................................................. 10-251645

(51) Int. Cl.$^7$ ...................................................... B60K 1/00
(52) U.S. Cl. ........................... 701/22; 180/165; 180/652; 180/654
(58) Field of Search .................................. 180/165, 65.1, 180/65.2, 65.3, 65.4, 65.8, 197; 701/22, 70, 81, 89; 318/139, 140, 141

(56) References Cited

U.S. PATENT DOCUMENTS

| | | | |
|---|---|---|---|
| 5,301,764 | * 4/1994 | Gardner | 180/65.4 |
| 5,327,987 | * 7/1994 | Abdelmalek | 180/65.4 |
| 5,346,031 | * 9/1994 | Gardner | 180/65.4 |
| 5,495,906 | 3/1996 | Furutani | 180/65.2 |
| 5,562,566 | * 10/1996 | Yang | 180/65.2 |
| 5,788,005 | * 8/1998 | Arai | 180/65.2 |
| 6,059,064 | * 5/2000 | Nagano et al. | 180/65.4 |

FOREIGN PATENT DOCUMENTS

| | | |
|---|---|---|
| 7-117512 | 5/1995 | (JP) . |
| 8-126117 | 5/1996 | (JP) . |
| 8-140207 | 5/1996 | (JP) . |
| 8-300964 | 11/1996 | (JP) . |
| 8-300965 | 11/1996 | (JP) . |
| 9-2090 | 1/1997 | (JP) . |
| 9-224304 | 8/1997 | (JP) . |
| 9-294308 | 11/1997 | (JP) . |
| 9-298802 | 11/1997 | (JP) . |

* cited by examiner

Primary Examiner—Richard M. Camby
(74) Attorney, Agent, or Firm—Oblon, Spivak, McClelland, Maier & Neustadt, P.C.

(57) ABSTRACT

A controller for controlling a hybrid front-and-rear-drive automotive vehicle including a front wheel and a rear wheel an engine, an electric generator operated by the engine, and an electric motor operable with an electric energy generated by the electric generator, and wherein one and the other of the front and rear wheels is driven by the engine and the electric motor, respectively, the controller includes an electric energy storage device, and a cooperative energy supply device for supplying an electric current from the electric energy storage device to the electric motor, concurrently with a supply of an electric energy from the electric generator to the electric motor, to operate the electric motor for driving the other of the front and rear wheels.

15 Claims, 20 Drawing Sheets

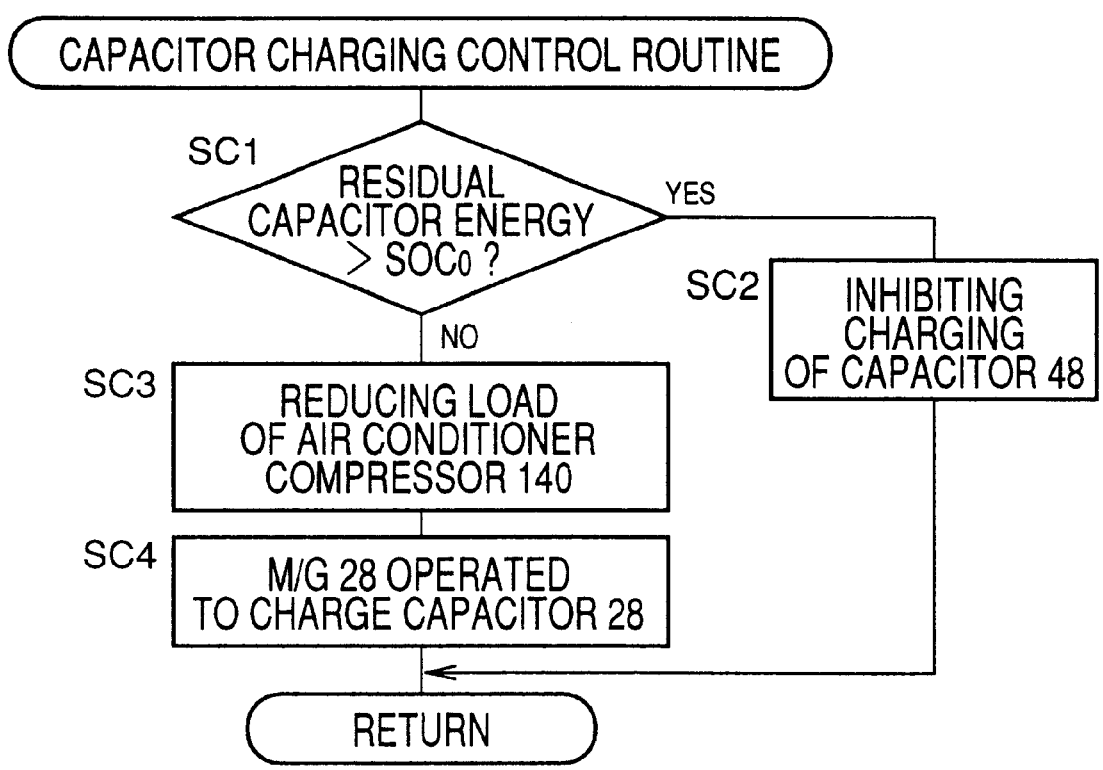

CONTROLLER FOR HYBRID VEHICLE WHEREIN ONE AND THE OTHER OF FRONT AND REAR WHEELS ARE RESPECTIVELY DRIVEN BY ENGINE AND ELECTRIC MOTOR

BACKGROUND OF THE INVENTION

1. Field of the Invention

The present invention relates to a controller for a hybrid front-and-rear-drive automotive vehicle wherein an engine and an electric motor are provided as two drive power sources for operating one and the other of front and rear wheel drive systems, respectively.

2. Discussion of the Related Art

There is known an automotive vehicle of a type wherein an internal combustion engine is used to drive one of a front wheel drive system and a rear wheel drive system while an electric motor is used to drive the other of the front and rear wheel drive systems. In this type of automotive vehicle, all of the four wheels can be driven by concurrent operations of the engine and the electric motor. For instance, the electric motor is activated to drive the wheels of one of the front and rear wheel drive systems while the wheels of the other drive system is operated by the engine. In this respect, the vehicle of the type in question may be called a hybrid 4-wheel-drive vehicle. For improved overall driving performance of this hybrid 4-wheel-drive vehicle while maintaining high degrees of fuel economy and other running characteristics of the vehicle, the electric motor is activated to assist the engine, namely, to provide an engine-assisting motor drive torque only where the vehicle is placed in a predetermined running condition requiring acceleration of the vehicle.

In the field of such a hybrid front-and-rear-drive vehicle, it has been proposed to provide an electric generator operable by the engine for generating an electric energy used for operating the electric motor, in an attempt to eliminate a high-voltage battery for operating the electric motor, and reducing the size of the electric motor. An example of such a hybrid front-and-rear-drive vehicle is disclosed in JP-A-8-126117.

In the hybrid front-and-rear-drive vehicle wherein the electric motor is operated by an electric energy supplied thereto directly from the electric generator driven by the engine, as described above, however, an operation of the electric motor is more or less delayed since it takes a time for the electric energy to rise to a level sufficient for starting the electric motor. Accordingly, an increase of the engine-assisting torque generated by the electric motor is delayed. Where the vehicle is started on an ascending road surface having a relatively high gradient, by concurrent operations of the engine and the electric motor, the delayed increase of the engine-assisting motor torque will unfavorable lead to initial slipping of the wheels driven by the engine on the ascending road surface.

SUMMARY OF THE INVENTION

It is therefore an object of the present invention to provide a controller for a hybrid front-and-rear-drive automotive vehicle wherein one and the other of the front and rear wheel drive systems are driven by an engine and an electric motor, respectively, which controller is adapted to effectively prevent a delay in an increase in the engine-assisting torque generated by the electric motor that is operated with an electric energy generated by an electric generator driven by the engine.

The above object may be achieved according to the principle of this invention, which provides a controller for controlling a hybrid front-and-rear-drive automotive vehicle including a front wheel and a rear wheel, an engine, an electric generator operated by the engine, and an electric motor operable with an electric energy generated by the electric generator, and wherein one and the other of the front and rear wheels is driven by the engine and the electric motor, respectively, the controller comprising: an electric energy storage device; and cooperative energy supply means for supplying an electric current from the electric energy storage device to the electric motor, concurrently with a supply of an electric energy from the electric generator to the electric motor, to operate the electric motor for driving the other of the front and rear wheels.

In the controller constructed according to the present invention as described above, the electric energy storage device is provided as a second power source for supplying an electric energy to the electric motor, in addition to the electric generator which is operated by the engine and provided as a first power source for operating the electric motor. When the electric motor is operated to drive the rear wheel, for example, to provide an engine assisting drive force for assisting the engine operating to drive the front wheel to start the vehicle, the cooperative energy supply means is operated to supply the electric energy from the electric energy storage device to the electric motor concurrently with the supply of the electric energy from the electric generator to the electric motor. This arrangement permits a sufficiently high rate of rise or increase of the engine assisting drive torque of the electric motor, even with some delay in the rise or increase of the amount of electric energy supplied to the electric motor from the electric generator operated by the engine. Accordingly, the vehicle can be smoothly started without significant slipping of the front wheel serving as the primary drive wheel, and can be run with high drivability even on an uphill road surface.

In one preferred form of the controller of the present invention, the electric energy storage device includes a capacitor which stores the electric energy by polarization of a dielectric material and which has an energy storage capacity sufficient to compensate for an initial shortage of the electric energy to operate the electric motor, which initial shortage would arise from a delayed increase of an amount of the electric energy supplied from the electric generator to the electric motor, if the electric motor were operated with only the electric energy supplied from the electric generator.

In the above preferred form of the invention, the capacitor of the type indicated above permits a sufficiently high rate of rise or increase of the electric energy to be supplied to the electric motor. The provision of the capacitor assures a further increase in the rate of rise of the engine assisting drive torque of the electric motor.

In another preferred form of the invention, the controller further comprises: a gradient detector for detecting a gradient of a road surface on which the vehicle lies; and electric power source control means for controlling, depending upon the gradient detected by the gradient detector, a ratio of the amount of electric energy to be supplied from the electric energy storage device to the electric motor, with respect to the amount of electric energy supplied from the electric generator to the electric motor. For instance, the electric power source control means may be adapted to reduce the above-indicated ratio of the amount of electric energy to be supplied from the electric energy storage device to the electric motor is reduced as the gradient is reduced. Alternatively, the electric power source control means may consist of electric power source switching means for zeroing the amount of electric energy to be supplied from the electric energy storage device to the electric motor when the gradient detected by the gradient detector is lower than a predetermined threshold. Thus, the electric power source control means is effective to reduce the amount of consumption of the electric energy stored in the electric energy storage device.

In a further preferred form of the invention, the controller further comprises charging means operated immediately after termination of an operation of the electric motor, for charging the electric energy storage device with the electric energy generated by the electric generator, depending upon the amount of electric energy stored in the electric energy storage device immediately after the termination of the operation of the electric motor. This arrangement permits a sufficiently high rate of rise of the engine assisting drive torque of the electric motor, even where the engine assisting operation of the electric motor is repeatedly performed on the road surface having a relatively low friction coefficient.

In a still further preferred form of the invention, the controller further comprises drive force reducing means for reducing a drive force of the above-indicated one of the front and rear wheels, if a running speed of the vehicle cannot be raised to a predetermined threshold due to slipping of the above-indicated one wheel driven by the engine, in spite of an operation of the electric motor. The drive force reducing means may include engine load increasing means for increasing a load acting on the engine. Where the vehicle includes an automatic transmission through which an output of the engine is transmitted to the one of the front and rear wheels, the engine load increasing means may comprise at least one of: means for activating an engine-driven device which is operated by the engine and which has been held off; means for maximizing a load acting on the engine-driven device which has already been activated; means for shifting up the automatic transmission; means for effecting partial slipping of a friction coupling device of the automatic transmission which is to be engaged to establish an operating position of the automatic transmission different from a presently established operating position thereof; and means for increasing the amount of electric energy generated by the electric generator. Alternatively, the drive force reducing means may include means for effecting partial slipping of a brake of the automatic transmission which has been engaged to hold stationary a reaction member of the automatic transmission to establish a presently selected operating position thereof. In this alternative arrangement, the drive force of the above-indicated one wheel driven by the engine can be reduced without increasing the engine load. The drive force reducing means which has been discussed above is effective to reduce the amount of slipping of the above-indicated one wheel for thereby increasing the traction force of the vehicle upon starting of the vehicle.

In a yet further preferred form of the invention, the controller further comprises: residual energy amount detecting means for determining whether a residual amount of electric energy stored in the electric energy storage device is larger than a predetermined lower limit; and charging control means operable when the residual energy amount detecting means determines that the residual amount of electric energy is not larger than the predetermined lower limit, for charging the electric energy storage device with an electric energy generated by conversion of a kinetic energy of the vehicle while the vehicle is running in a non-decelerating state.

In the above preferred form of the invention, the charging control means is operated when the residual energy amount detecting means determines that the electric energy amount stored in the capacitor is not larger than the lower limit. The charging control means is adapted to charge the electric energy storage device with an electric energy which is generated by conversion of a kinetic energy of the vehicle running in a non-decelerating state, namely, while the vehicle is running at a substantially constant speed or in the process of acceleration. Thus, as long as the residual electric energy amount stored in the electric energy storage device is not larger than the lower limit, the storage device is charged under the control of the charging control means, even while the vehicle is not in the process of deceleration. This arrangement is effective to assure a sufficient amount of electric energy stored in the electric energy storage device before the electric motor is operated to provide an engine assisting torque for driving the above-indicated other of the front and rear wheels. In other words, the present arrangement is effective to prevent a shortage of the electric energy for effecting the engine-assisting operation of the electric motor.

In one advantageous arrangement of the above preferred form of the invention comprising the charging control means, the controller further comprises vehicle accelerating operation detecting means for determining whether an accelerating operation to accelerate the vehicle has been performed by an operator of the vehicle, and wherein the charging control means is operated to charge the electric energy storage device when the residual energy amount detecting means determines that the residual amount of electric energy stored in the electric energy storage device is not larger than the predetermined lower limit, and when the vehicle accelerating operation detecting means determines that the vehicle accelerating operation has been performed by the operator of the vehicle operator. In this arrangement, the electric energy storage device is charged with a portion of a vehicle driving force which has been increased by the vehicle accelerating operation. Since the vehicle is accelerated, the charging of the electric energy storage device will not cause the vehicle operator to feel an appreciable drop of the vehicle driving force.

The above advantageous arrangement is suitably applicable to the vehicle including an automatic transmission disposed between the engine and the above-indicated one of the front and rear wheels. In this arrangement, the controller preferably further comprises transmission speed-ratio increasing means for increasing a speed ratio of the automatic transmission when the vehicle accelerating operation detecting means determines that the accelerating operation has been performed by the operator of the vehicle operator. The speed ratio of the automatic transmission is a ratio of an input speed of the automatic transmission to an output speed of the automatic transmission. An increase in the speed ratio of the automatic transmission will provide a surplus vehicle driving torque, so that the amount of the kinetic energy of the vehicle that can be used to charge the electric energy storage device is increased. Accordingly, the charging of the storage device will not cause the vehicle operator to feel an appreciable drop of the vehicle driving force.

In another advantageous arrangement of the above-indicated preferred form of the invention including the charging control means, the vehicle further includes an automatic continuously variable transmission disposed between the engine and the one of the front and rear wheels, the controller further comprising: continuously variable transmission control means for continuously controlling a speed ratio of the continuously variable transmission so that an actual speed of the engine coincides with a target value which is determined on the basis of an actual running speed of the vehicle and a currently required output of the engine, and according to a stored predetermined target determining relationship among the target value, the actual running speed of the vehicle and the currently required output of the engine; and relationship changing means operable when the vehicle accelerating operation detecting means determines that the accelerating operation to accelerate the vehicle has been performed by the operator of the vehicle, for changing the stored predetermined target determining relationship to a maximum fuel economy relationship, so that the engine is operated with maximum fuel economy with the speed ratio being continuously controlled so that the :actual speed of the engine coincides with the target value determined according to the maximum fuel economy relationship. The present arrangement is effective to improve the fuel economy of the vehicle, since the electric energy storage device is charged while the engine is operated with maximum fuel economy.

In a further advantageous arrangement of the above-preferred form of the invention including the charging control means, the vehicle further includes an engine-driven device driven by the engine, and the controller further comprises load reducing means for reducing a load acting on the engine-driven device when the residual energy amount detecting means determines that the residual amount of electric energy stored in the electric energy storage device is not larger than the predetermined lower limit. The charging control means is operated when the load acting on the engine-driven device is reduced by the load reducing means. A reduction in the load of the engine-driven device operated by the engine will provide a surplus vehicle driving torque, so that the amount of the kinetic energy of the vehicle that can be used for regeneration of an electric energy to charge the electric energy storage device is increased. Accordingly, the charging of the electric energy storage device will not cause the vehicle operator to feel an appreciable drop of the vehicle driving force.

In the above arrangement, the charging control means may be adapted to charge the electric energy storage device such that an amount of electric energy stored in the electric energy storage device corresponds to an amount of reduction of the load of the engine-driven device by the load reducing means. Since the amount of surplus vehicle driving torque which is provided by the reduction of the load of the engine-driven device is equal to the amount of electric energy which is generated by the regenerative braking torque and is stored in the electric energy storage device, the vehicle driving force will not be reduced unexpectedly to the vehicle operator, when the electric energy storage device is charged.

The present invention also provides a controller for controlling a hybrid front-and-rear-drive automotive vehicle including a front wheel, a rear wheel, a first drive power source for driving one of the front and rear wheels, a second drive power source for driving the other of the front and rear wheels, and an energy storage device for storing an energy for operating the second drive power source, and wherein the energy storage device is charged with an energy generated by conversion of a kinetic energy of the vehicle while the vehicle is running in a deceleration state, the controller comprising: residual energy amount detecting means for determining whether a residual amount of energy stored in the energy storage device is larger than a predetermined lower limit; and charging control means operable when the residual energy amount detecting means determines that the residual amount of energy is not larger than the predetermined lower limit, for charging the energy storage device with an energy generated by conversion of a kinetic energy of the vehicle while the vehicle is running in a non-decelerating state.

The present invention also provides a controller for controlling a hybrid front-and-rear-drive automotive vehicle including a front wheel, a rear wheel, a first drive power source for driving one of the front and rear wheels, and a second drive power source for driving the other of the front and rear wheels, and wherein a driving force of the above-indicated one of the front and rear wheels which is driven by the first drive power source is reduced, and the second drive power source is operated to drive the other wheel, while the above-indicated one wheel has a slipping tendency, the controller comprising: drive force reduction detecting means for determining whether the drive force of the above-indicated one wheel has been reduced to eliminate the slipping tendency; running condition detecting means for determining whether the vehicle is in a running condition in which the vehicle can be run forward; and inhibiting means for inhibiting an operation of the second drive power source if the drive force reduction detecting means determines that the drive force of the above-indicated one wheel has been reduced and if the running condition detecting means determines that the vehicle is in the above-indicated running condition.

The present invention also provides a controller for controlling a hybrid front-and-rear-drive automotive vehicle including a front wheel, a rear wheel, a first drive power source for driving one of the front and rear wheels, and a second drive power source for driving the other of the front and rear wheels, and wherein a driving force of the above-indicated one of the front and rear wheels which is driven by the first drive power source is reduced, and the second drive power source is operated to drive the other wheel, while the above-indicated one wheel has a slipping tendency, the controller comprising: drive force reduction detecting means for determining whether the drive force of the above-indicated one wheel has been reduced to eliminate the slipping tendency; vehicle speed change monitoring means for determining whether a running speed of the vehicle is not lower than a predetermined threshold above which the vehicle can be run forward even on a road surface having a low friction coefficient; and inhibiting means for inhibiting an operation of the second drive power source if the drive force reduction detecting means determines that the drive force of the above-indicated one wheel has been reduced and if the vehicle speed change monitoring means determine that the running speed of the vehicle is not lower than the predetermined threshold.

The present invention further provides a controller for controlling a hybrid front-and-rear-drive automotive vehicle including a front wheel, a second wheel, a first drive power source for driving one of the front and rear wheels, and a second drive power source for driving the other of the front and rear wheels, and wherein a driving force of the above-indicated one of the front and rear wheels which is driven by the first drive power source is reduced, and the second drive power source is operated to drive the other wheel, while the above-indicated one wheel has a slipping tendency, the controller comprising second drive power source control means for controlling an output of the second drive power source, on the basis of a change of a running condition of the vehicle when a drive force of the second drive power source is reduced.

The present invention further provides a controller for controlling a hybrid front-and-rear-drive automotive vehicle including a front wheel, a rear wheel, a first drive power source for driving one of the front and rear wheels, and a second drive power source for driving the other of the front and rear wheels, the controller comprising: a road gradient detecting device for detecting a gradient of a road surface on which the vehicle lies; and second drive power source control means for determining an output torque of the second drive power source on the basis of the gradient of the road surface detected by the road gradient detecting device, and controlling the second drive power source so that the second drive power source produces the output torque determined.

BRIEF DESCRIPTION OF THE DRAWINGS

The above and optional objects, features, advantages and technical and industrial significance of this invention will be better understood by reading the following detailed description of presently preferred embodiments or modes of the invention, when considered in connection with the accompanying drawings, in which:

FIG. 22 is a flow chart illustrating a capacitor charging control routine executed by the motor control device of FIG. 21.

DETAILED DESCRIPTION OF THE PREFERRED EMBODIMENTS

Figure 1:
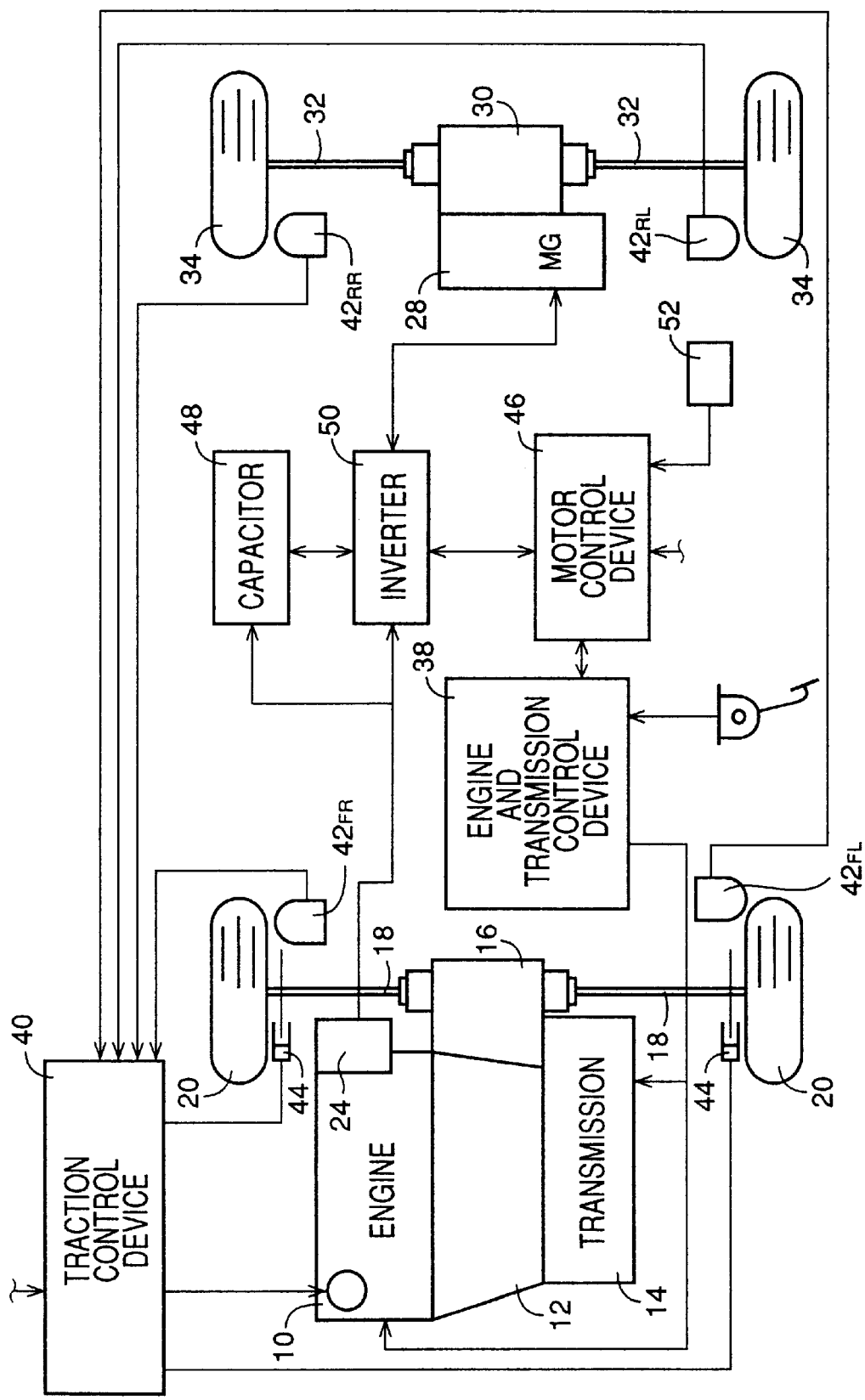
FIG. 1 is a view illustrating a power transmitting system of a hybrid front-and-rear-drive automotive vehicle in the form of a hybrid 4-wheel-drive automotive vehicle, which includes a controller constructed according to one embodiment of this invention.

Referring first to FIG. 1, there is shown a power transmitting system of a hybrid front-and-rear-drive automotive vehicle in the form of a hybrid 4-wheel-drive automotive vehicle which is principally driven by a front wheel drive system including an internal combustion engine 10 such as a gasoline engine or a diesel engine. An output torque of the engine 10 is transferred to a pair of front wheels 20 serving as primary drive wheels, through a torque convertor 12, a transmission 14, a front differential gear device 16 and a front axle 18. The engine 10 is provided with an electric generator 24 exclusively used to generate an electric energy. The front wheel drive system is constituted by the engine 10, torque convertor 12, transmission 14, front differential gear device 16, front axle 18 and front wheels 20.

The hybrid 4-wheel-drive vehicle further includes a rear wheel drive system including an electric motor/generator 28 (hereinafter abbreviated as "MG 28"), whose output is transferred to a pair of rear wheels 34 serving as auxiliary drive wheels, through a rear differential gear device 30 and a rear axle 32. Thus, the rear wheel drive system is constituted by the MG 28, rear differential gear device 30, rear axle 32 and rear wheels 34. When the MG 28 is operated as a second drive source to drive the vehicle in addition to the first drive source in the form of the engine 10, the vehicle is driven by all of the four wheels 20, 34. It will be understood that the present hybrid 4-wheel-drive vehicle does not have a propeller shaft extending in the longitudinal direction.

The MG 28 functions not only as an electric motor operated by an electric energy supplied from the electric generator 24 for driving the rear wheels 34, but also as an electric generator operated by a kinetic energy of the running vehicle for generating an electric energy (regenerative energy). The electric generator 24 used for operating the MG 28 has an electricity generating capacity which is higher than that of the MG 28.

The transmission 14 may be either a manual transmission, or an automatic transmission. For instance, the manual transmission may be a parallel two-axes type transmission including a plurality of gear sets each consisting of two meshing gears mounted on respective two parallel shafts. The automatic transmission may be a planetary gear type transmission including a plurality of planetary gear sets whose rotary elements are selectively connected to each other or held stationary by a plurality of hydraulically operated frictional coupling devices selectively engaged to establish an appropriate one of a plurality of operating positions having different speed ratios. Alternatively, the automatic transmission may be a continuously variable transmission, which may be a belt-and-pulley type wherein effective diameters of two pulleys connected to each other by a belt are continuously variable by a hydraulically operated actuator.

The engine 10 and the transmission 14 are controlled by an electronic engine and transmission control device 38, which is adapted to effect various controls such as: a fuel injection control for controlling a time of injection of a fuel into the engine 10, on the basis of an actual speed $N_E$ of the engine 10, an intake air quantity Q/N or an intake pipe pressure $P_{IN}$; and according to a stored predetermined relationship between the fuel injection time and the value $N_E$, Q/N or $P_{IN}$; an ignition timing control for controlling a basic timing of ignition of the air-fuel mixture, on the basis of the actual engine speed $N_E$ or the intake air quantity Q/N, and according to a stored predetermined relationship between the ignition timing and the value $N_E$ or Q/N; an idling speed control for controlling an idling control valve such that the actual idling speed of the engine 10 coincides with a target value which is determined in a suitable manner; and a transmission control, if the transmission 14 is an automatic transmission, for automatically shifting the transmission 14, on the basis of an actual running speed V of the vehicle and an operation amount θ of an accelerator pedal (which determines an opening angle of a throttle valve of the engine 10), and according to stored predetermined shift patterns which represent relationships among the operating positions of the automatic transmission 14, the running speed V, and the operation amount θ of the accelerator pedal (hereinafter referred to as "accelerator operation amount θ") which represents a vehicle drive force currently required by the vehicle operator.

The engine 10 is also controlled by an electronic traction control device 40, which is adapted to control also front wheel brakes 44 provided to brake the front wheels 20. Described in detail, the traction control device 40 is adapted to receive output signals from wheel speed sensors $42_{FR}$, $42_{FL}$, $42_{RR}$ and $42_{RL}$, which are provided to detect rotating speeds $V_{FR}$, $V_{FL}$, $V_{RR}$ and $V_{RL}$ of the right and left front wheels 20 and the right and left rear wheels 34, respectively. The rotating speeds $V_{FR}$, $V_{FL}$, $V_{RR}$ and $V_{RL}$ represent the vehicle running speed V as calculated from the number of revolutions per minute of the wheels 20, 34. The traction control device 40 also calculates a front wheel speed $V_F$ which is equal to $(V_{FR}+V_{FL})/2$, a rear wheel speed $V_R$ which is equal to $(V_{RR}+V_{RL})/2$, and estimate the vehicle running speed V. The estimation of the running speed V may be effected such that the lowest one of the wheel speeds $V_{FR}$, $V_{FL}$, $V_{RR}$ and $V_{RL}$ is determined as the running speed V. The traction control device 40 is further adapted to calculate a slip speed ΔV of the front wheels 20 driven by the engine 20, which slip speed ΔV is a difference between the front wheel speed $V_F$ and the rear wheel speed $V_R$ (average speed of the rear wheels 34 which are not driven by the engine 10). Upon determination that the calculated slip speed ΔV of the front wheels 20 exceeds a predetermined threshold $ΔV_2$, the traction control device 40 initiates a traction control for controlling the throttle valve or fuel injection amount to regulate the output of the engine 10, and for regulating braking forces generated by the front wheel brakes 44, so as to reduce the drive forces applied to the front wheels 20, so that a slip ratio Rs=$(ΔV/V_F)$ of the front wheels 20 is held within a predetermined target range Rs* indicated in the graph of FIG. 2. This graph shows a change of a friction coefficient μ of the front wheels 20 with respect to the road surface. It will be understood from the graph that the peak or maximum value of the friction coefficient μ is in the target range Rs*.

Figure 3:
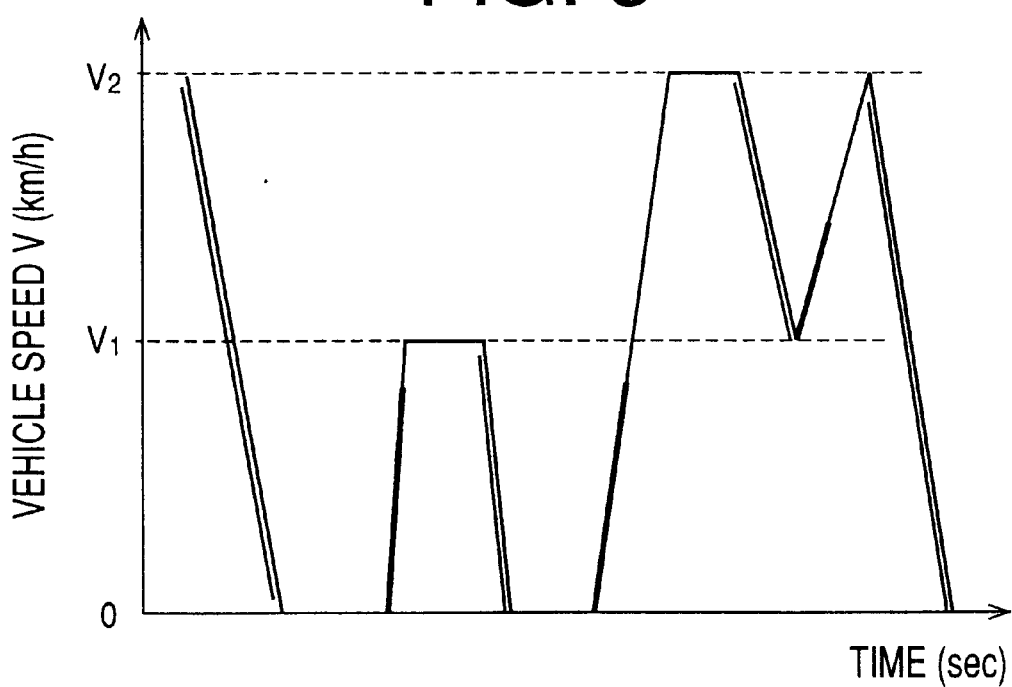
FIG. 3 is a graph for explaining an operation of an electric motor controlled by an electronic motor control device, wherein thick lines indicate time periods of operations of the electric motor to generate an engine-assisting torque, while double lines indicate time periods of regenerative braking operations of the electric motor by a kinetic energy of the vehicle.

The MG 28 is controlled by an electronic motor control device 46, which is adapted to effect: a regenerative braking control wherein an electric energy generated by the MG 28 operated by a kinetic energy of the vehicle during braking of the vehicle (as indicated by the double lines in the graph of FIG. 3) is stored in a capacitor 48; a high-μ road engine-assisting motor control wherein the electric energy stored in the capacitor 48 is supplied to the MG 28 through the inverter 50, to operate the MG 28 as the electric motor, depending upon the accelerator operation amount θ, for providing an engine-assisting drive force to be applied to the rear wheels 34, in addition to a drive force produced by the engine 10 to drive the front wheels 20, during starting or acceleration of the vehicle on a normal dry or other road surface having a relatively high friction coefficient μ, so that the fuel economy of the engine 10 is improved; and a low-μ road engine-assisting motor control wherein the MG 28 is operated by the electric energy stored in the capacitor 48 and the electric energy supplied from the electric generator 28, to drive the rear wheels 34, as needed, for the purpose of permitting smooth starting of the vehicle without an excessive slipping of the front wheels 20, during starting of the vehicle on a frozen, snow-covered or other road surface having a relatively low friction coefficient μ. The inverter 50 is controlled by the motor control device 46, by applying a controlled current to the inverter 50, for controlling: an electric current to be generated by the MG 28 during the regenerative braking; an electric current to be applied to the MG 28 during the high-μ and low-μ road engine-assisting motor controls; an electric current to be supplied from the electric generator 24; an electric current to be supplied from the capacitor 48; and an electric current to be stored in the capacitor 48.

The motor control device 46 is adapted to receive an output signal of a road gradient sensor 52, which may be a gravity sensor or a road surface inclination measuring device, whose output is used while the vehicle is stationary. Based on the output signal of the road gradient sensor 52, the motor control device 46 obtains a road surface inclination angle $θ_{ROAD}$, or a road surface gradient a which is equal to $\tan θ_{ROAD}$. Each of the engine and transmission control device 38, traction control device 40 and motor control device 46 is constituted by a so-called microcomputer incorporating a central processing unit (CPU), a read-only memory (ROM), a random-access memory (RAM) and input and output interfaces. The CPU performs signal processing operations to produce control signals, according to control programs stored in the ROM while utilizing a temporary data storage function of the RAM. The signals received, stored and calculated by the individual microcomputers for the control devices 38, 40, 46 are transferred to each other, as needed.

Figure 2:
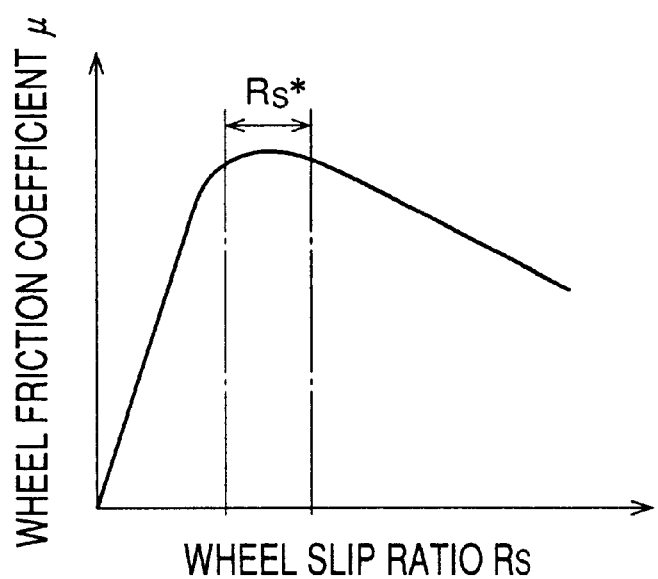
FIG. 2 is a graph for explaining an operation of an electronic traction control device included in the power transmitting system of FIG. 1.
Figure 4:
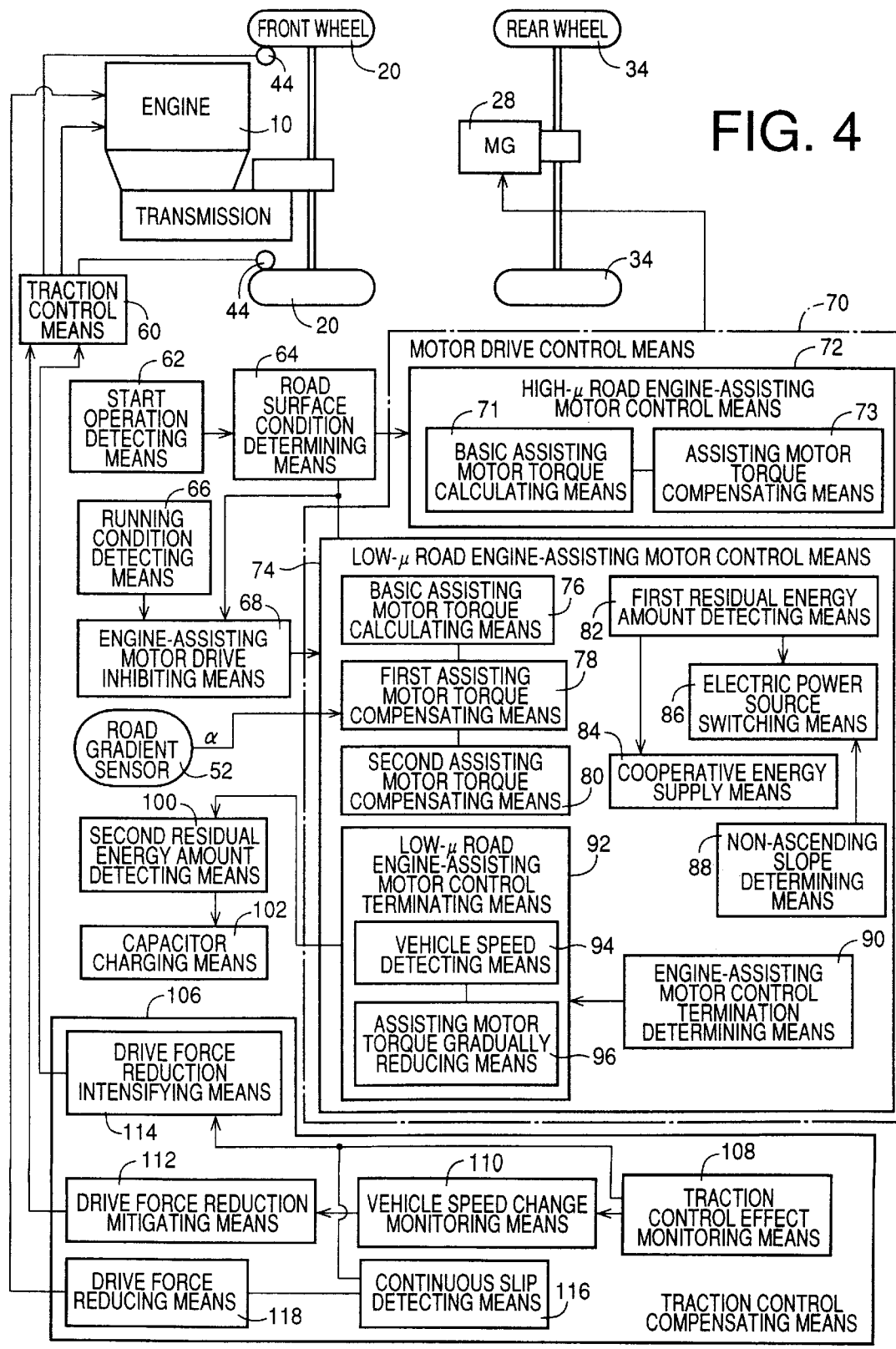
FIG. 4 is a functional block diagram showing various control means of the electronic motor control device.

Referring next to the functional block diagram of FIG. 4, there will be described various functional means of the motor control device 46, which is connected to the engine 10 and traction control means 60 as well as the MG 28. The traction control means 50, which corresponds to the traction control device 50 shown n FIG. 1, is adapted to effect the traction control of the front wheels 20, during starting of the vehicle on the road surface having a relative low friction coefficient $\mu$, so as to maintain the slip ratio $Rs=\Delta V/V_F$ of the front wheels 20 within the target range Rs*, in view of the characteristic relationship between the slip ratio Rs and the friction coefficient $\mu$ as shown in the graph of FIG. 2. More specifically described, the opening angle of the throttle valve or the fuel injection time amount of the engine 10 is controlled to regulate the output of the engine 10 and at the same time control the braking forces produced by the front wheel brakes 44, SO that the slip ratio Rs of the front wheels 20 is held within the predetermined target range Rs, for thereby facilitating the starting of the vehicle. The traction control by the traction control means 60 is continued even after the estimated vehicle speed V is substantially zeroed, as long as the calculated front wheel speed $V_F$ is equal to or higher than a detectable lower limit of about 1–2 km/h.

The motor control device 46 includes start operation detecting means 62 for determining whether the accelerator pedal has been depressed to start the vehicle. This determination is effected by determining whether the accelerator operation amount $\theta$ has increased, while the vehicle is stationary, that is, while the vehicle speed V is equal to or lower than a threshold value Vx1 of about 1–2 km/h, which is the detectable lowest vehicle speed V. That is, if the accelerator operation amount $\theta$ has increased, the start operation detecting means 62 determines that the accelerator pedal has been depressed by the vehicle operator to start the vehicle. In this case, the vehicle is started by the front wheels 20 driven by the engine 10, and by the rear wheels 34 driven by the MG 28 under the control of high-$\mu$ road engine-assisting motor control means 72 (which will be described), if the friction coefficient $\mu$ of the road surface is relatively high.

The road surface condition is detected by road surface condition determining means 64, which is operated upon determination by the start operation detecting means 62 that the accelerator pedal has been depressed to start the vehicle, as described above. The road surface condition determining means 64 determines, based on the slipping state of the front wheels 20, whether the road surface on which the front wheels 20 lie is a normal or dry or other road surface having a relatively high friction coefficient $\mu$ or a frozen, snow-covered or other road surface having a relatively low friction coefficient $\mu$. For instance, the road surface condition determining means 64 determines that the friction coefficient $\mu$ is relatively low, if the slip speed $\Delta V$ is higher than the predetermined threshold $\Delta V_2$, as described above with respect to the traction control device 40. This determination is based on a known relationship that the friction coefficient $\mu$ of the road surface decreases with an increase in the slip speed $\Delta V$. Thus, the condition used by the road surface condition determining means 64 to determine that the friction coefficient $\mu$ is relatively low is substantially the same as the condition used by the traction control means 60 to initiate the traction control. Accordingly, if the road surface condition determining means 64 determines that the road surface has the relatively low friction coefficient $\mu$, the traction control of the front wheels 20 by the traction control means 60 has been initiated. In this respect, the road surface condition determining means 64 can be used as drive force reduction detecting means for detecting that the drive forces of the front wheels 20 have been reduced by the traction control means 60.

The motor control device 36 further includes running condition detecting means 66 which is operated after the road surface condition determining means (drive force reduction detecting means) 64 has determined that the friction coefficient $\mu$ of the road surface is relatively low or that the traction control of the front wheels 20 has been initiated to reduce the drive forces of the front wheels 20. The running condition detecting means 66 is adapted to determine whether the hybrid 4-wheel-drive vehicle is in a running condition that permits the vehicle to be run forward by the traction control of the front wheels 20 under slipping, without operation of the MG 28 to drive the rear wheels 34. This determination by the running condition detecting means 66 is made by determining whether the running speed V has been increased, namely, whether the running speed $V_{tx+}1$ detected in the present control cycle is higher than the running speed $V_{tx}$ detected in the last control cycle. If an affirmative decision is obtained by this determination, the running condition detecting means 66 determines that the vehicle can be run forward without an operation of the MG 28 concurrently with an operation of the engine 10.

The motor control device 46 further engine-assisting motor drive inhibiting means 68, which is operated to inhibit an engine-assisting operation of the MG 28, upon determination by the running condition detecting means 66 that the vehicle can be run forward without an operation of the MG 28, after determination by the road surface condition detecting means 64 that the traction control of the front wheels 20 has been initiated. The engine-assisting operation of the MG 28 is initiated and controlled by motor drive control means 70, which includes the above-indicated high-$\mu$ road engine-assisting motor control means 72 and low-$\mu$ road engine-assisting motor control means 74 which will be described. In the above conditions, the vehicle can be run forward without an engine-assisting operation of the MG 28 to drive the rear wheels 34 concurrently with an operation of the engine 10 to drive the front wheels 20.

The high-$\mu$ road engine-assisting motor control means 72 of the motor drive control means 70 is adapted to operate the MG 28 to drive the rear wheels 34 for thereby assisting the engine 10 to accelerate the vehicle on a road surface having a relatively high friction coefficient $\mu$. On the other hand, the low-$\mu$ road engine-assisting motor control means 74 is adapted to operate the MG 28 to drive the rear wheels 34 for thereby assisting the engine 10 to smoothly start the vehicle without slipping of the front wheels 20 (front and rear wheels 20, 34) on a frozen, snow-covered or other road surface having a relatively low friction coefficient $\mu$.

Figure 5:
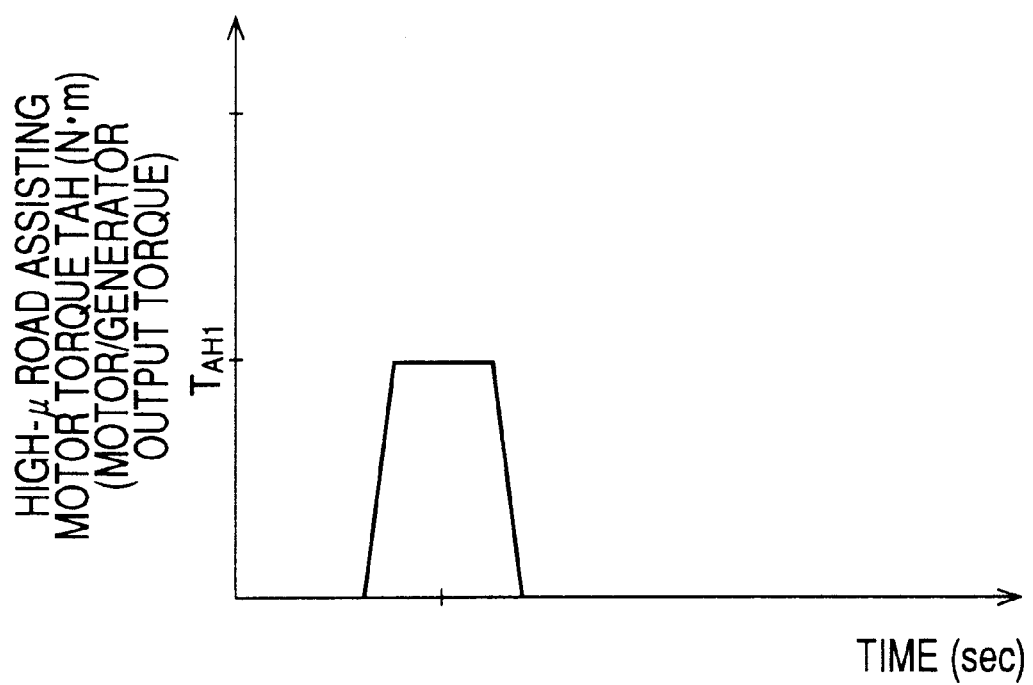
FIG. 5 is a graph for explaining an operation of high-$\mu$ road engine-assisting motor control means of the motor control device shown in FIG. 4.

During operation of the high-$\mu$ road engine-assisting motor control means 72 to start the vehicle, the MG 28 is operated by an electric energy stored in the capacitor 48, so that a high-$\mu$ road assisting torque $T_{AH}$ generated by the MG 28 is rapidly increased to a target value $T_{AH1}$ which is obtained by compensating a basic torque value $T_{AH0}$ determined by the accelerator operation amount $\theta$, depending upon the road surface gradient $\alpha$. As shown in the graph of FIG. 5 by way of example, the high-$\mu$ road assisting torque $T_{AH}$ is held at the target value $T_{AH1}$ for a relatively short time, and is then rapidly reduced at a given rate. The high-$\mu$ road engine-assisting motor control means 72 includes basic assisting motor torque calculating means 71 for calculating the basic torque value $T_{AH0}$ indicated above, and assisting motor torque compensating means 73 for calculating the target torque value $T_{AH1}$ by compensating the basic torque value $T_{AH0}$.

Figure 7:
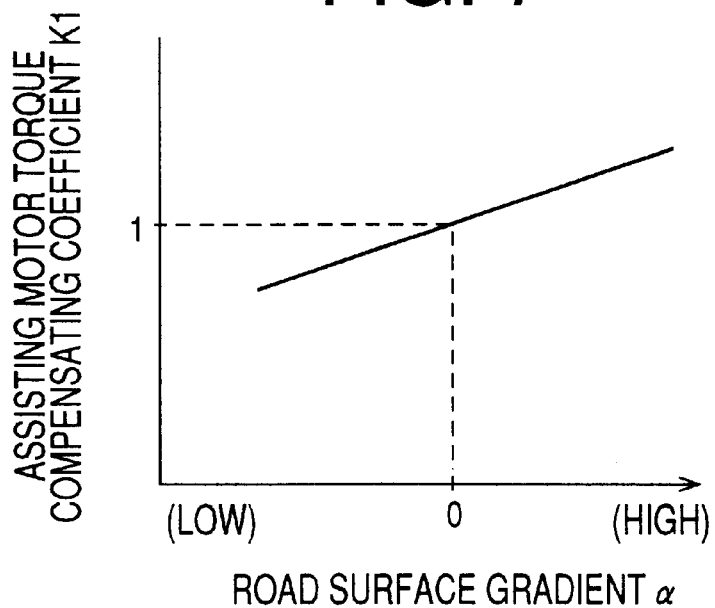
FIG. 7 is a graph indicating a relationship used by first assisting motor torque compensating means included in the low-$\mu$ road engine-assisting motor control means of FIG. 4.

The basic assisting motor torque calculating means 71 calculates the basic torque value $T_{AH0}$ on the basis of the rear load ratio of the vehicle and the currently required output torque of the engine 10 (accelerator operation amount θ) and according to a stored predetermined relationship among the basic torque value $T_{AH0}$, rear load ratio and currently required engine output. This relationship is determined to increase the basic torque value $T_{AH0}$ with an increase in the currently required engine output. The assisting motor torque compensating means 73 determines an assisting motor torque compensating coefficient K1 o the basis of the road surface gradient α and according to a stored predetermined relationship between the coefficient K1 and the gradient α, as indicated in the graph of FIG. 7 by way of example. This relationship is determined to increase the target torque value $T_{AH1}$ with an increase in the gradient α. The assisting motor torque compensating means 73 is further adapted to multiply the above-indicated basic torque value $T_{AH0}$ by the calculated compensating coefficient K1, to obtain the target torque value $T_{AH1}$ to which the assisting torque $T_{AH}$ generated by the MG 28 is rapidly increased.

Figure 16:
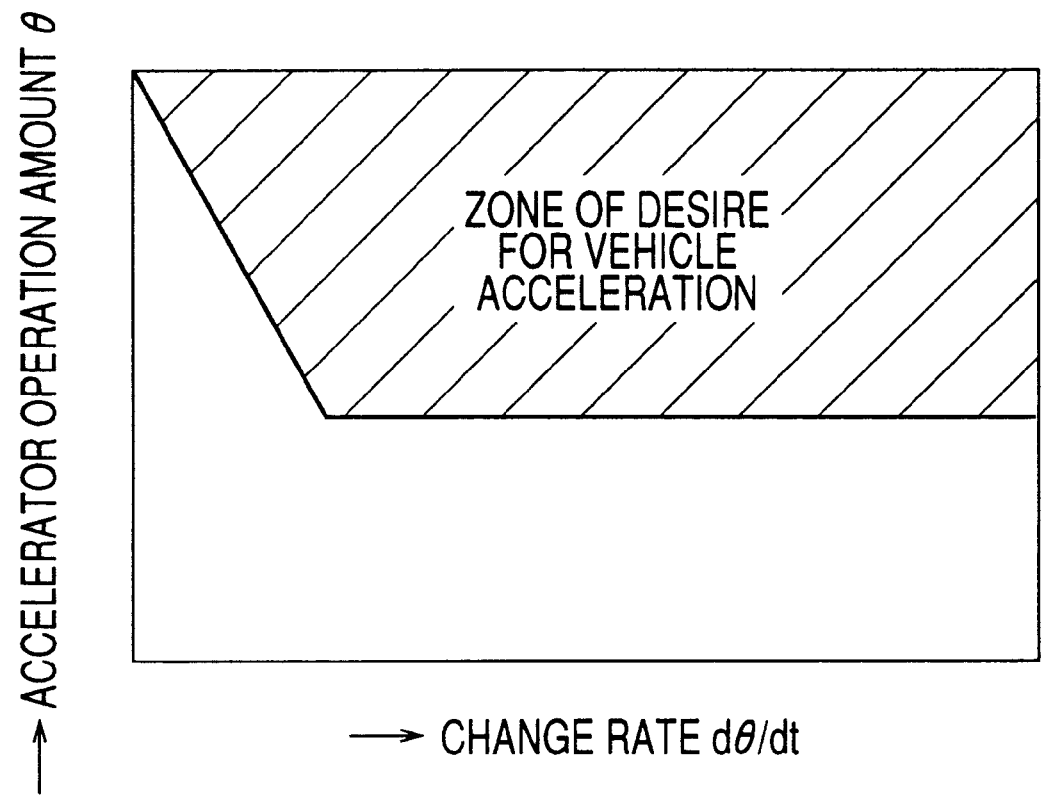
FIG. 16 is a graph indicating a relationship used to determine whether the electric motor should be operated to generate an engine-assisting torque during an operation of the accelerator pedal.

During running of the vehicle after the starting, the MG 28 is operated in substantially the same manner as described above, if it is determined that the vehicle operator desires to accelerate the vehicle. For instance, this determination may be effected by determining whether a point represented by the actual accelerator operation amount θ and a rate of change dθ/dt of this amount θ is located within a predetermined zone of desire for the vehicle acceleration, as indicated in the graph of FIG. 16. Data representative of this zone is stored in the ROM of the motor control device 46.

Figure 6A:
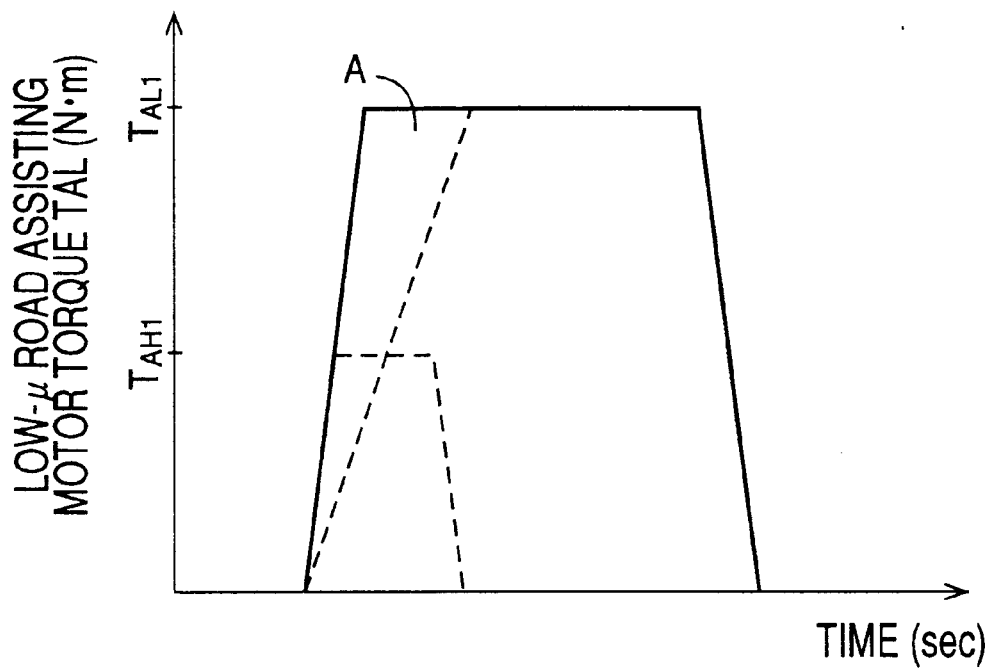
FIGS. 6A and 6B are graphs for explaining operations of a low-$\mu$ road engine-assisting motor control means of the motor control device shown in FIG. 4, when a capacitor used for operating the electric motor is not charged and is charged by an electric generator operated by the engine.
Figure 6B:
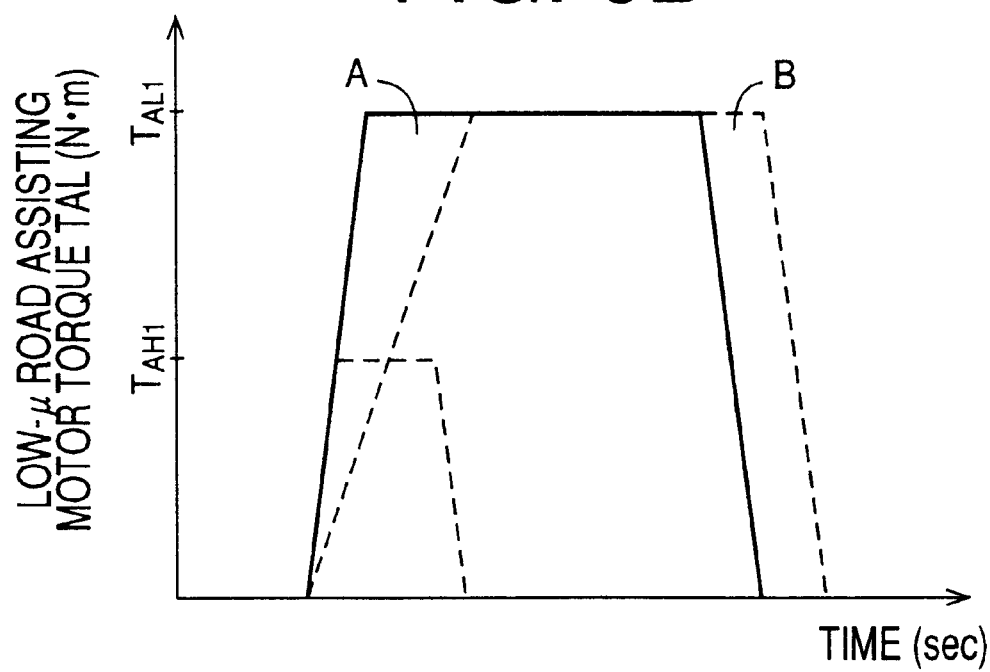

During operation of the low-μ road engine-assisting motor control means 74, the MG 28 is operated by the electric energy stored in the capacitor 48 and the electric energy generated by the electric generator 24, so that a low-μ road assisting torque $T_{AL}$ generated by the MG 28 is rapidly increased to a target value $T_{AL1}$ which is larger than the target value $T_{AH1}$ of the high-μ road assisting torque $T_{AH}$, as indicated by solid lines in FIGS. 6A and 6B. The target value $T_{AL1}$ generated by the MG 28 under the control of the low-μ road engine-assisting motor control means 74 is calculated on the basis of the condition of the vehicle upon starting thereof, that is, the rear load ratio, accelerator operation amount θ, road surface gradient α and road surface friction coefficient μ. Although the rate of rise of the electric energy supplied from the electric generator 24 is relatively low, the low-μ road assisting torque $T_{AL}$ can be rapidly increased to the calculated target value $T_{AL1}$ owing to the supply of the electric energy supplied from the capacitor 48 to the MG 28 without a delay, in addition to the electric energy received from the electric generator 24, so that the vehicle can be smoothly started with the aid of the rear wheels 34 driven by the MG 28, without initial slipping of the front wheels 20 driven by the engine 10.

Dashed lines in FIGS. 6A and 6B indicating a relatively low rate of change of the low-μ road assisting torque $T_{AL}$ correspond to the electric energy supplied from the electric generator 24. A triangular area A defined by the solid and dashed lines in the figures corresponds to the amount of the electric energy supplied from the capacitor 48, that is, the amount of shortage of the electric energy due to the delayed supply of the electric energy from the generator 24. The capacitor 48 has a storage capacity enough to store an amount of electric energy sufficient to cover the expected amount of shortage of the electric energy required for the MG 28, which amount of shortage is caused by the delayed supply of the electric energy from the generator 24 to the MG 28.

The low-μ road engine-assisting motor control means 74 includes basic assisting motor torque calculating means 76 for calculating a basic value $T_{AL0}$ of the low-μ road assisting torque $T_{AL}$, first assisting motor torque compensating means 78 for compensating the basic value $T_{AL0}$ on the basis of the road surface gradient α, and second assisting motor torque compensating means 80 for compensating the basis value $T_{AL0}$ on the basis of the road surface friction coefficient μ. The basic assisting motor torque calculating means 76 calculates the basic value $T_{AL0}$ on the basis of the rear load ratio and the currently required engine output (accelerator operation amount θ) and according to a stored predetermined relationship among the basic value $T_{AL0}$, rear load ratio and currently required engine output. This relationship is determined to increase the basic value $T_{AL0}$ with an increase in the currently required engine output.

Figure 8:
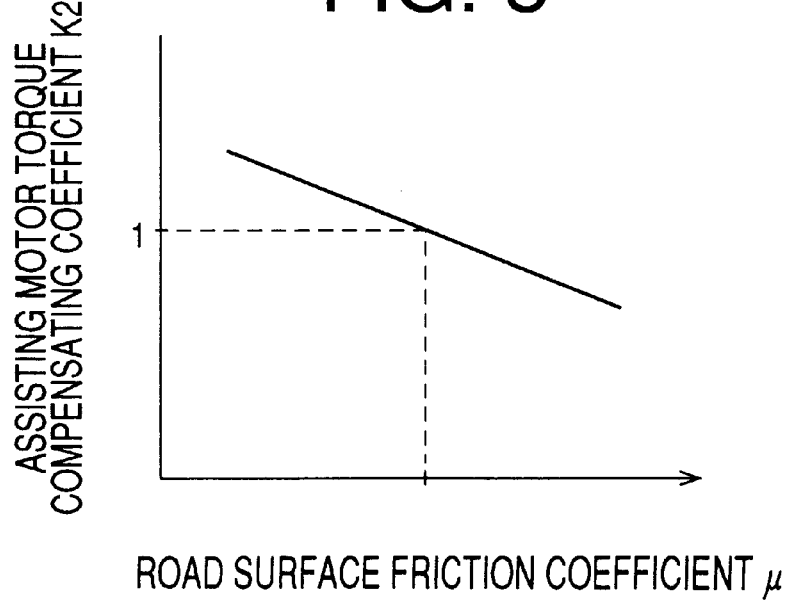
FIG. 8 is a graph indicating a relationship used by second assisting motor torque compensating means included in the low-$\mu$ road engine-assisting motor control means of FIG. 4.
Figure 9:
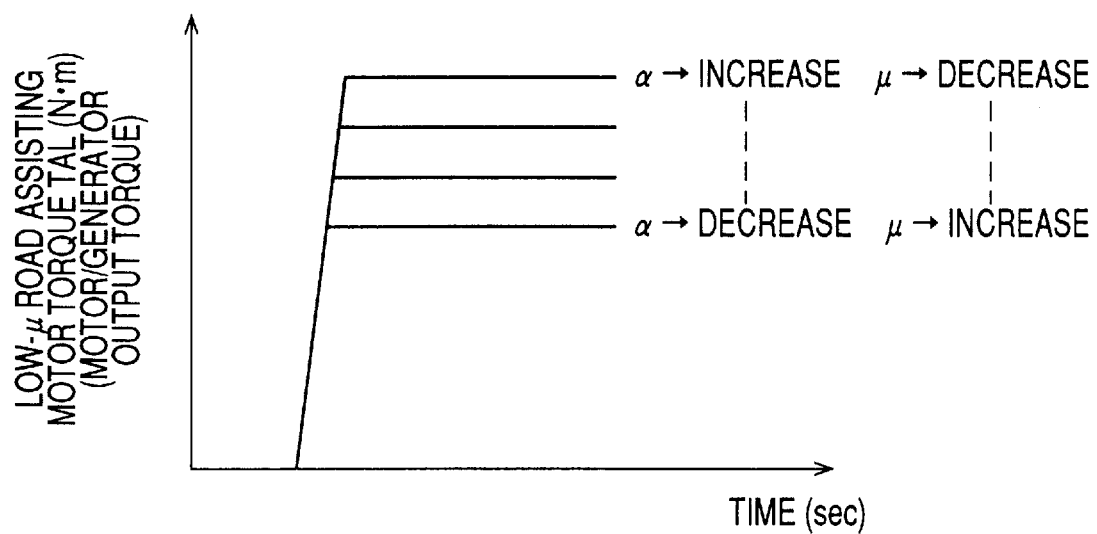
FIG. 9 is a graph indicating a relationship among a low-$\mu$ road assisting motor torque $T_{AL}$ generated by the electric motor controlled by the low-$\mu$ road engine-assisting motor control means of FIG. 4, a road surface gradient $\alpha$ and a road surface friction coefficient $\mu$.

The first assisting motor torque compensating means 78 compensates the basic value $T_{AL0}$ to obtain the target value $T_{AL1}$ such that the target value $T_{AL1}$ increases with an increase in the road surface gradient α. The second assisting motor torque compensating means 80 compensates the basic value $T_{AL0}$ to obtain the target value $T_{AL1}$ such that the target value $T_{AL1}$ decreases with an increase in the road surface friction coefficient μ. For instance, the first assisting motor torque compensating means 78 is adapted to determine a compensating coefficient K1 on the basis of the detected road surface gradient α and according to a relationship between the coefficient K1 and the gradient α, as indicated in the graph of FIG. 7 by way of example. The compensating means 78 multiplies the basic value $T_{AL0}$ by the determined compensating coefficient K1. The second assisting motor torque compensating means 80 may be adapted to determine a compensating coefficient K2 on the basis of the road surface friction coefficient μ and according to a predetermined relationship between the coefficients K2 and μ, as indicated in the graph of FIG. 8 by way of example. The compensating means 80 multiplies the product of the basic value $T_{AL0}$ and the coefficient K1 by the coefficient K2 to obtain the target low-μ road assisting torque $T_{AL1}$, which is equal to $T_{AL0} \cdot K1 \cdot K2$. The graph of FIG. 9 indicates the above-indicated relationships used by the compensating means 78, 80 to compensate the basic value $T_{AL0}$ to obtain the low-μ road assisting motor torque $T_{AL}$, more precisely, the target value $T_{AL1}$.

The low-μ engine-assisting motor control means 74 further includes: first residual energy amount detecting means 82 operable during the low-μ road engine-assisting control of the MG 28; cooperative energy supply means 84 for concurrently supplying the electric energies from the capacitor 48 and the generator 24 to the MG 28; electric power source control means in the form of electric power source switching means 86 for terminating the supply of the electric energy from the capacitor 48 to the MG 28, to operate the MG 28 with only the electric energy supplied from the electric generator 24; and non-ascending slope determining means 88 for supplying the electric energy from the electric generator 24 to the MG 28 when the road surface is not ascending.

The first residual energy amount detecting means 82 is adapted to determine whether the amount of the electric energy SOC currently stored in the capacitor 48 is larger than a predetermined lower limit SOCo, that is, sufficient to operate the MG 28. The cooperative energy supply means 84 is operated upon determination by the first residual energy amount detecting means 82 that the electric energy amount SOC stored in the capacitor 48 is larger than the lower limit SOCo. This cooperative energy supply means 84 is adapted to supply the electric energy from the capacitor 48 to the MG 28, concurrently with the supply of the electric energy from the electric generator 24 to the MG 28, so that the total electric energy supplied to the MG 28 can be rapidly raised for permitting the vehicle to be smoothly started by the engine 10 and the MG 28. The electric power source switching means 86 is operated upon determination by the first residual energy amount detecting means 82 that the electric energy amount SOC is not larger than the lower limit SOCo. In this case, the switching means 86 terminates the supply of the electric energy from the capacitor 48 to the MG 28, so that the MG 28 is operated with only the electric energy supplied from the generator 24. The non-ascending slope determining means 88 is adapted to determine whether the road surface gradient $\alpha$ is lower than a threshold $\alpha 0$, to determine that the road surface is a non-ascending surface, for instance, a flat surface, if the gradient $\alpha$ is lower than the threshold $\alpha 0$. In this case where there is not a possibility of slipping of the front wheels 20 during starting of the vehicle, the non-ascending slope determining means 88 supplies the electric energy from the electric generator 24 to the MG 28, without a supply of the electric energy from the capacitor 48.

The lower limit SOCo is the required amount of electric energy stored in the capacitor 48, which is required to permit a rapid rise of the assisting torque $T_{AL}$ generated by the MG 28 when operated by the electric energy received from the capacitor 48 as well as the electric energy received from the generator 24. While the present embodiment uses the electric power source control means in the form of the electric power source switching means 86, the electric power source control means may be adapted to reduce the amount of the electric energy to be supplied from the capacitor 48 to the MG 28, rather than to terminate the supply of the electric energy from the capacitor 48 to the MG 28.

Immediately after the cooperative energy supply means 84 is operated, the inverter 50 is controlled to supply the electric energy from the capacitor 48 to the MG 28, concurrently with the supply of the electric current from the generator 24 to the MG 28, so that the electric energy supplied from the capacitor 48 meets the difference A between the required total engine-assisting motor torque $T_{AL}$ indicated by the solid lines in FIGS. 6A and 6B, and the torque corresponding to the electric energy generated by the generator 24, which torque is indicated by the dashed lines in the figures. If the front wheel speed $V_F$ is raised due to slipping of the front wheels 20, the automatic transmission 14 is shifted up so that the engine speed $N_E$ is lowered, resulting in an accordingly low operating speed of the generator 24. In this condition, the cooperative energy supply means 84 shifts down the transmission 14 to raise the engine speed $N_E$ for thereby increasing the operating speed of the generator 24. Further, the cooperative energy supply means 84 controls the inverter 50 so that a portion of the thus increased amount of the electric energy generated by the generator 24 is stored in the capacitor 48. Thus, the load acting on the generator 24 is increased to increase the load acting on the engine 10, for reducing the driving force applied to the front wheels 20, when the amount of slipping of the front wheels 20 exceeds a given upper limit. Alternatively, a compressor for an air conditioner may be operated by the engine 10 to increase the engine load.

The low-$\mu$ road engine-assisting motor control means 74 further includes engine-assisting motor control termination determining means 90 for determining whether the engine-assisting control of the MG 28 should be terminated. This determination is made by determining whether any one of predetermined terminating conditions for terminating the engine-assisting control of the MG 28 is satisfied. For instance, the terminating conditions include: a condition that the slip speed $\Delta V$ of the front wheels 20 has become lower than a threshold $\Delta V_1$ lower than the threshold $\Delta V_2$ above which the engine-assisting control of the MG 28 is initiated; a condition that the accelerator operation amount $\theta$ has become smaller than a threshold which is close to zero; and a condition that the vehicle running speed V has become higher than a threshold V×2.

The low-$\mu$ road engine-assisting motor control means 74 further includes engine-assisting motor control terminating means 92 which includes vehicle speed detecting 94 and assisting motor torque gradually reducing means 96. The vehicle speed detecting means 94 determines whether the vehicle speed V is equal to or higher than the above-indicated threshold V×2. The assisting motor torque gradually reducing means 96 gradually reduces the low-$\mu$ road assisting torque $T_{AL}$ toward zero at a relatively low rate, as long as the vehicle speed detecting means 94 determines that the vehicle speed V is equal to or higher than the threshold V×2. Thus, the assisting torque $T_{AL}$ torque generated by the MG 28 is gradually reduced while the vehicle speed V is equal to or higher than the threshold V×2, after any one of the above-indicated terminating conditions is satisfied. The threshold value V×2 is a vehicle speed above which the vehicle can be run in the forward direction, even in the presence of some amount of slipping of the front wheels 20. The threshold value V×2 may be several km/h or on the order of 10 km/h.

The motor control device 46 further includes second residual energy amount detecting means 100 operable after termination of the low-$\mu$ road engine-assisting control of the MG 28, for determining whether the amount of electric energy SOC stored in the capacitor 48 is larger than the lower limit SOCo described above with respect to the first residual energy amount detecting means 82. The motor control device 46 further includes capacitor charging means 102 operable if the second residual energy amount detecting means 100 determines that the electric energy amount SOC stored in the capacitor 48 is not larger than the lower limit SOCo. In this case, the capacitor charging means 102 continues the operation of the generator 24 to charge the capacitor 48 whose electric energy has been used to effect the low-$\mu$ road engine-assisting control of the MG 28. The amount of electric energy stored in the capacitor 48 by the capacitor charging means 102 corresponds to an area B defined by the solid and dashed lines in FIG. 6B, which indicate the fall of the low-$\mu$ road assisting torque $T_{AL}$. Namely, the generator 24 is held operated for an additional time length corresponding to the area B, for the purpose of charging the capacitor 48 if the electric energy amount SOC in the capacitor 48 is not larger than the lower limit SOCo.

The motor control device 48 further includes traction control compensating means 106, which includes traction control effect monitoring means 108, vehicle speed change monitoring means 110, drive force reduction mitigating means 112, drive force reduction intensifying means 114, continuous slip detecting means 116, and drive force reducing means 118. The traction control effect monitoring means 106 is adapted to determine whether the traction control of the front wheels 20 by the traction control means 60 during the low-$\mu$ road engine-assisting control of the MG 28 is effective to reduce the slipping tendency of the front wheels 20. This determination is made by determining whether the vehicle speed V is lower than a predetermined threshold $V_{TRCO}$. The vehicle speed change monitoring means 112 is operated if the traction control effect monitoring means 108 determines that the traction control is effective. In this case, the vehicle speed change monitoring means 112 determines whether the vehicle speed V is being increased or held substantially constant. This determination may be made by determining whether the vehicle speed $Vt_{x+1}$ detected in the present control cycle is higher than the vehicle speed $V_{tx}$ detected in the last control cycle. The drive force reduction mitigating means 112 is not operated if the vehicle speed change monitoring means 110 determines that the vehicle speed V is being increased. If the monitoring means 110 determines that the vehicle speed V is held substantially constant, the drive force reduction mitigating means 112 is operated to reduce the amount of reduction of the drive force of the front wheels 20, by reducing the braking force generated by the front wheel brakes 44, the amount of fuel injection into the engine 10, or the amount of retardation of the ignition timing of the engine 10, for example. If the traction control effect monitoring means 108 determines that the traction control is not effective, the drive force reduction intensifying means 114 is operated to increase the amount reduction of the drive force of the front wheels 20, for reducing the slip ratio of the front wheels 20. The continuous slip detecting means 116 is operated following the drive force reduction intensifying means 114, to determine whether the front wheels 20 are held in an excessively slipping state for more than a predetermined time. This determination is made by determining whether the slip ratio Rs of the front wheels 20 is higher than the target slip ratio Rs*. If the continuous slip detecting means 116 determines that the front wheels 20 are held in the excessively slipping state for more than the predetermined time, the drive force reducing means 118 is operated to reduce the drive force of the front wheels 20, by increasing the load acting on the engine 10, and/or by effecting partial slipping of a brake of the transmission 14 which has been engaged to hold stationary a reaction member of the transmission 14 to establish the presently selected operating position. The load acting on the engine 10 can be reduced by at least one of the following methods, for example: activating a non-activated engine-driven device such as the air conditioner, which is operated by the engine 10; maximizing the load of the already activated engine-driven device; shifting up the transmission 14; effecting partial slipping of a frictional coupling device of the transmission 14 which is to be engaged to establish an operating position of the transmission 14 different from the presently established operating position; and increasing the amount of generation of the electric energy by the generator 24.

Figure 10:
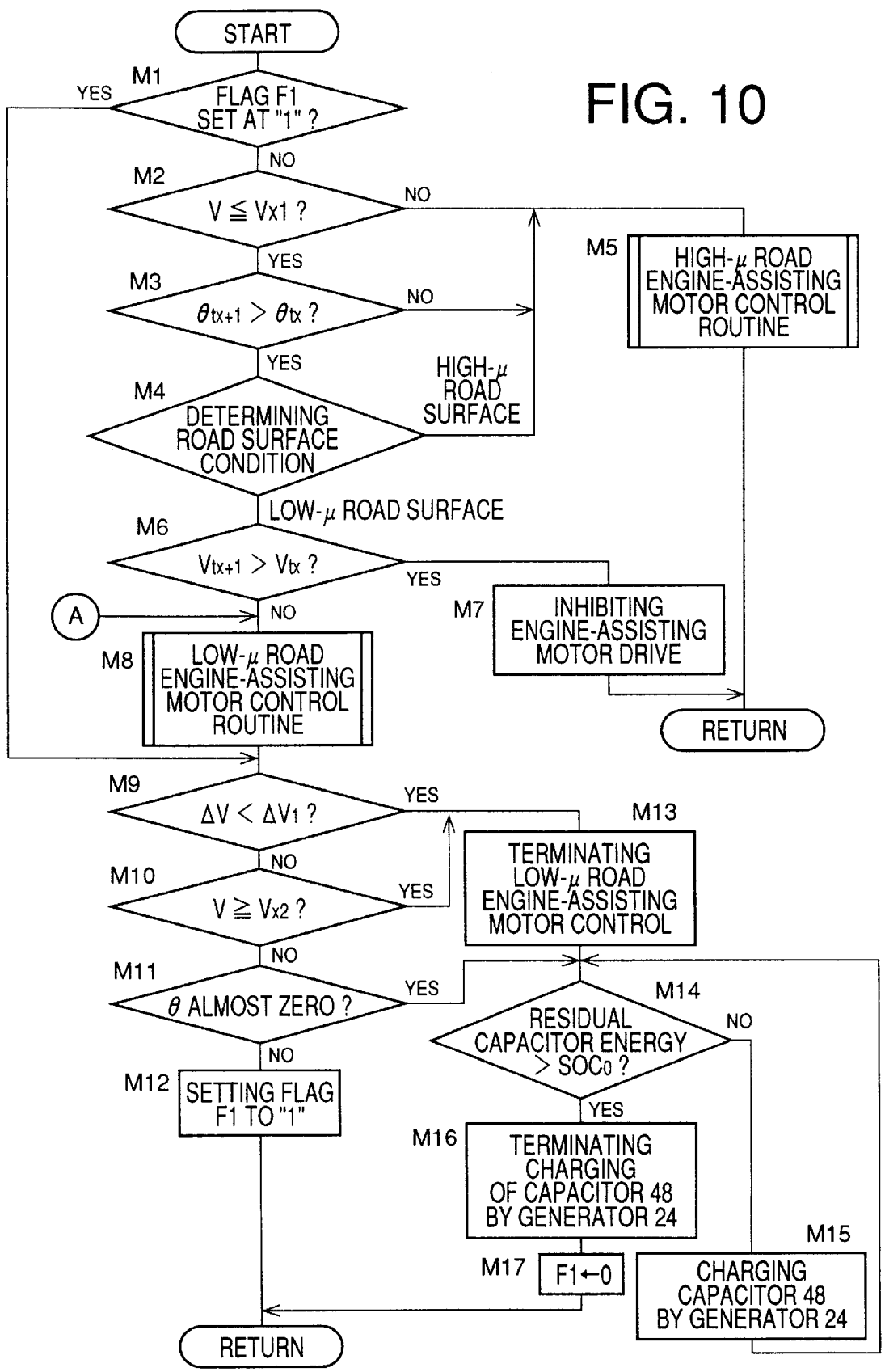
FIG. 10 is a flow chart illustrating an engine-assisting motor control main routine executed by the electronic motor control device shown in FIG. 1.

The electronic motor control device 46 executes an engine-assisting motor control main routine illustrated in the flow chart of FIG. 10. This main routine is initiated with step M1 to determine whether a flag F1 is set at "1". When this flag F1 is set at "1", it indicates that a low-$\mu$ engine-assisting motor control routine is being executed in step M8, which will be described referring to the flow chart of FIG. 13. If an affirmative decision (YES) is obtained in step M1, the control flow goes to step M9. Initially, a negative decision (NO) is obtained in step M1, and the control flow goes to steps M2 and M3 which correspond to the start operation detecting means 62. Step M2 is provided to determine whether the vehicle running speed V is equal to or lower than the threshold value Vx1 of about 1–2 km/h, which is the detectable lowest vehicle speed V. Step M3 is provided to determine whether the accelerator operation amount $\theta$ is being increased. This determination in step M3 is effected by determining whether the accelerator operation amount $\theta_{tx+1}$ detected in the present control cycle is larger than the amount $\theta_{tx}$ detected in the last control cycle.

If an affirmative decision (YES) is obtained in both of steps M2 and M3, the control flow goes to step M4 corresponding to the road surface condition determining means 64, to determine whether the road surface is a normal road surface having a relatively high friction coefficient $\mu$, or a frozen, snow-covered or other road surface having a relatively low friction coefficient $\mu$. This determination in step M4 is effected by determining whether the slip speed $\Delta V$ which is a difference between the front and rear wheel speeds $V_F$, $V_R$ is higher than the threshold $\Delta V_2$. If the front wheels 20 driven by the engine 10 do not have a slipping tendency immediately after the accelerator pedal has been depressed to start the vehicle, the road surface condition determining means 64 determines in step M4 that the road surface has a relatively high friction coefficient $\mu$. In this case, the control flow goes to step M5 wherein a high-$\mu$ road engine-assisting control of the MG 28 is effected to drive the rear wheels 34 by the MG 28, while the vehicle is driven by the front wheels 20 by the engine 10 on the road surface having the relatively high frequency $\mu$. It is noted that the slip speed $\Delta V$ has a close relationship with the friction coefficient $\mu$ of the road surface, so that the road surface can be determined to have a relatively low friction coefficient $\mu$ when the slip speed $\Delta V$ is higher than the threshold $\Delta V_2$, and to have a relatively high friction coefficient $\mu$ when the slip speed $\Delta V$ is lower than the threshold $\Delta V_2$.

Figure 11:
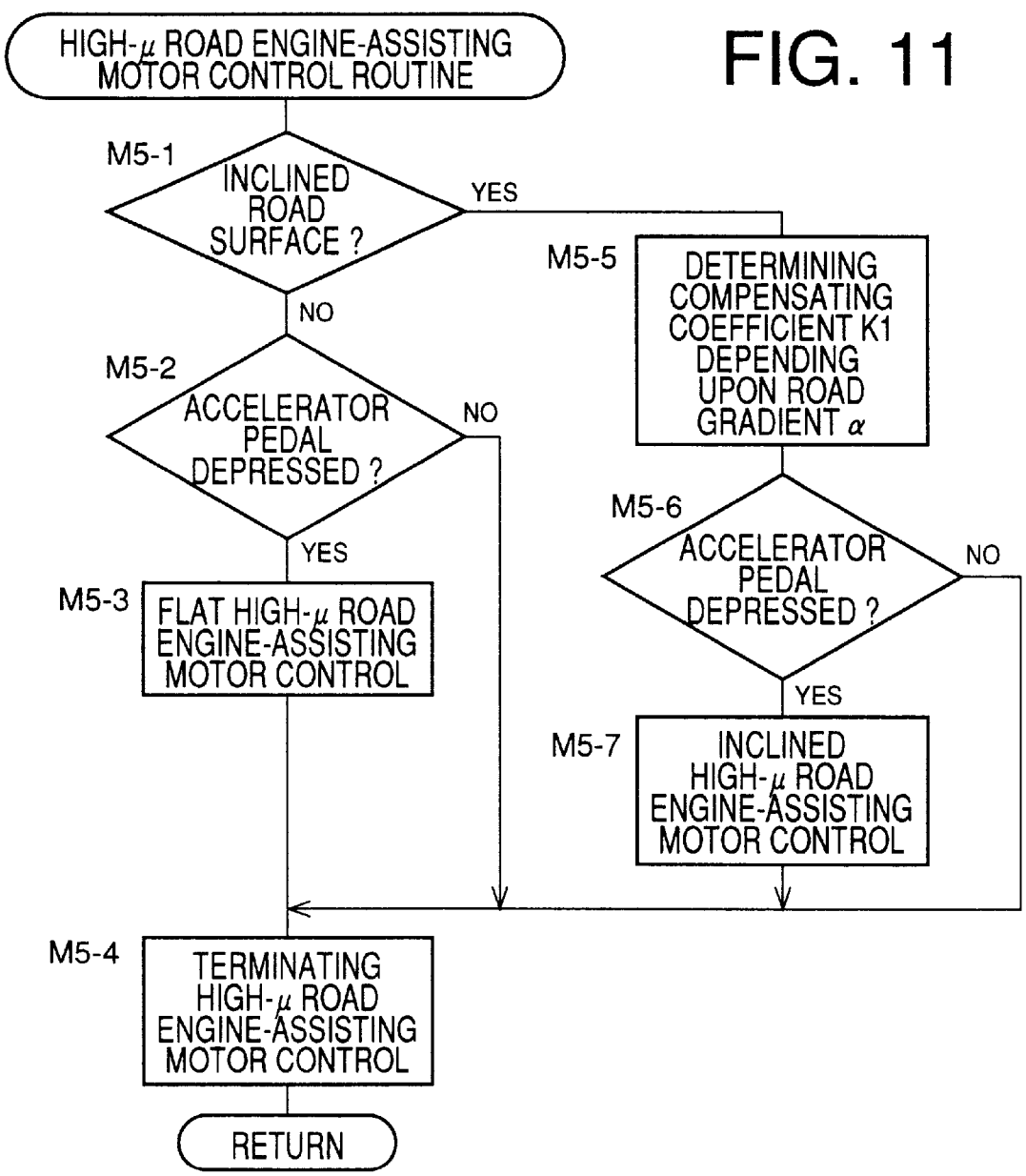
FIG. 11 is a flow chart illustrating a high-$\mu$ road engine-assisting motor control routine executed in step M5 of the main routine of FIG. 10.

If a negative decision (NO) is obtained in step M2 or M3, or if the road surface is determined in step M4 to have a relatively high friction coefficient $\mu$, the control flow goes to step M5 corresponding to the high-$\mu$ road engine-assisting motor control means 72, to execute a high-$\mu$ road engine-assisting motor control routine illustrated in the flow chart of FIG. 11, for effecting the high-$\mu$ road engine-assisting control of the MG 28. The high-$\mu$ road engine-assisting motor control routine of FIG. 11 is initiated with step M5-1 to determine whether the road surface on which the vehicle lies is inclined or not. This determination in step M5-1 is effected on the basis of the output signal of the road gradient sensor 52. If a negative decision (NO) is obtained in step M5-1, the control flow goes to step M5-2 to determine whether the vehicle operator desires to accelerate the vehicle. This determination in step M5-2 is effected by determining whether the accelerator operation amount $\theta$ or a rate of change $d\theta/dt$ of the amount $\theta$ is larger or lower than a predetermined threshold which is relatively small or low.

Figure 12A:
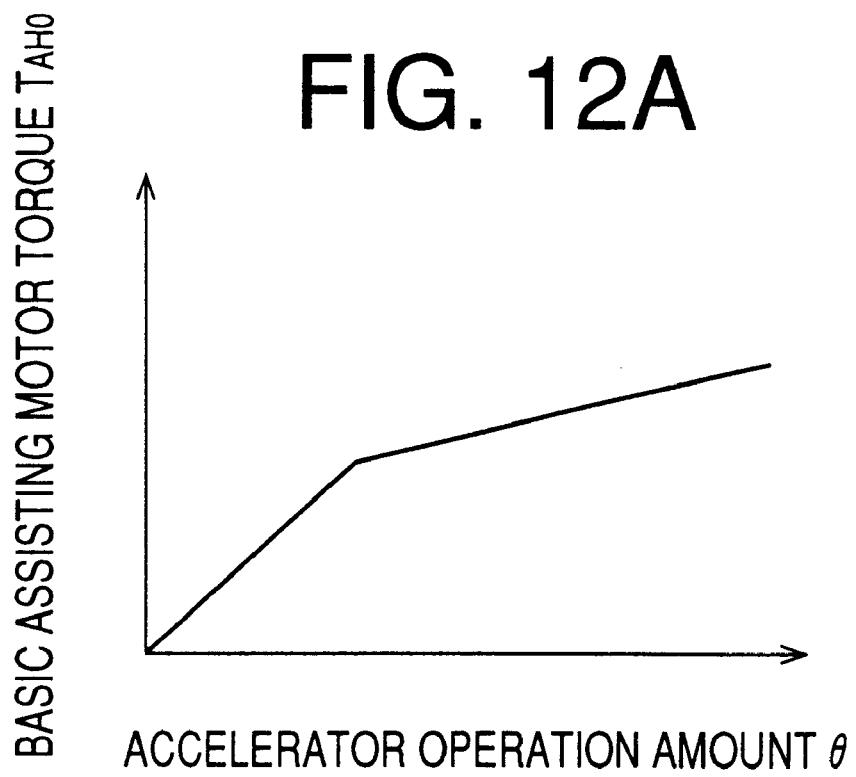
FIGS. 12A and 12B are graphs indicating respective two relationships used to determine a basic assisting motor torque $T_{AHO}$, depending upon an operation amount $\theta$ of an accelerator pedal and a change rate $d\theta/dt$ of this operation amount, respectively.
Figure 12B:
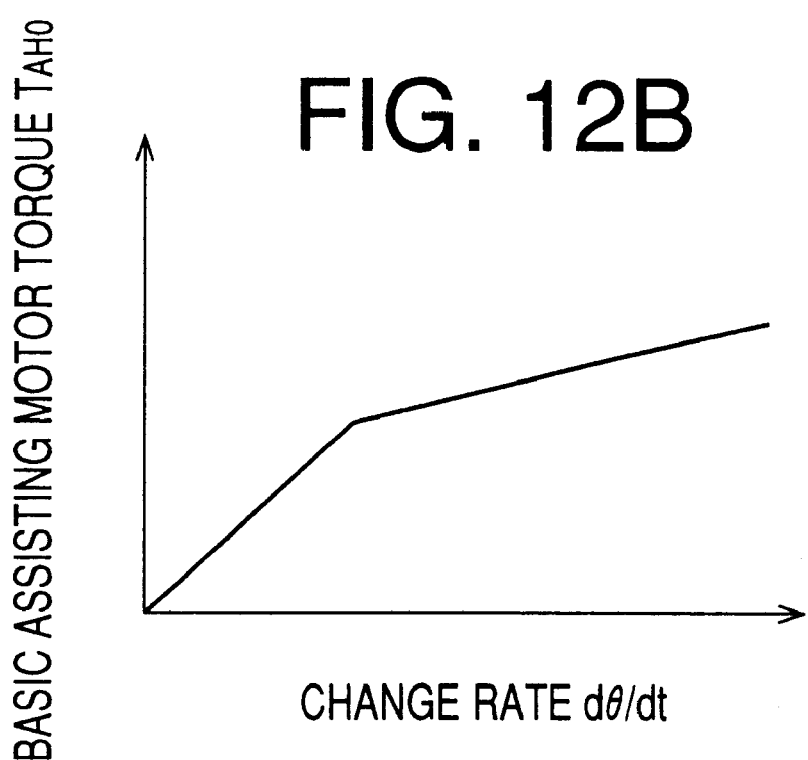

If a negative decision (NO) is obtained in step M5-2, it means that the vehicle operator does not desire to accelerate the vehicle, and the control flow goes to step M5-4 while skipping step M5-3. If an affirmative decision (YES) is obtained in step M5-2, it means that the vehicle operator desires to accelerate the vehicle, and the control flow goes to step M5-3 corresponding to the basic assisting motor torque calculating means 71, to calculate the basic value $T_{AH0}$ of the high-$\mu$ road assisting torque $T_{AH}$ to be generated by the MG 28. Accordingly, the MG 28 is operated to generate the basic assisting torque value $T_{AH0}$ to drive the rear wheels 34 while the front wheels 20 are driven by the engine 10 on the substantially flat road surface. For instance, the basic torque value $T_{AH0}$ is calculated based on the rear load ratio, such that the calculated value $T_{AH0}$ increases with an increase in the rear load value. Alternatively, the basic torque value $T_{AH0}$ is calculated based on the actual accelerator operation amount θ or its rate of change dθ/dt, and according to a predetermined relationship between the value $T_{AH0}$ and the value θ or dθ/dt. As indicated in the graphs of FIGS. 12A and 12B, the predetermined relationship is determined so that the calculated basic torque value $T_{AH0}$ increases with an increase in the value θ or dθ/dt. Then step M5-4 is implemented to terminate the high-μ road engine-assisting control of the MG 28 when the electric energy amount SOC stored in the capacitor 48 has been reduced to a predetermined value.

If an affirmative decision (YES) is obtained in step SM5-1, the control flow goes to step MS-5 corresponding to the assisting motor torque compensating means 73, to determine the compensating coefficient K1 for compensating the high-μ road assisting torque $T_{AH}$ depending upon the detected road surface gradient α, according to the predetermined relationship between the coefficient K1 and the gradient α, as indicated in the graph of FIG. 7, such that the coefficient K1 increases with an increase in the actual gradient α. Step M5-5 is followed by step M5-6 identical with step M5-2, to determine whether the vehicle operator desires to accelerate the vehicle. If the vehicle operator desires to accelerate the vehicle, the control flow goes to step M5-7 which corresponds to the basic assisting motor torque calculating means 71. In step M5-7, the basic high-μ road assisting torque $T_{AH0}$ is calculated as in step M5-3, and the calculated basic torque $T_{AH0}$ is compensated to obtain the target value $T_{AH1}$, which is equal to $T_{AH0}$·K1. The MG 28 is operated to provide the target torque value $T_{AH1}$, for effecting the high-μ road engine-assisting control of the MG 28 on the ascending or descending road surface. Step is also followed by step M5-4 to terminate the high-μ engine-assisting control of the MG 28 when the electric energy amount SOC in the capacitor 48 has been reduced to the predetermined value.

Referring back to the flow chart of FIG. 10, the control flow goes to step M6 corresponding to the running condition detecting means 66, if the road surface is determined in step M4 to be a frozen, snow-covered or other road surface having a relatively low friction coefficient μ. Step M4 is provided to determine whether the hybrid 4-wheel-drive vehicle is in a running condition that permits the vehicle to be run forward by the traction control of the front wheels 20 under slipping, without operation of the MG 28 to drive the rear wheels 34. This determination in step M6 is effected by determining whether the running speed V has been or is being increased, namely, whether the running speed $V_{rx+1}$ detected in the present control cycle is higher than the running speed $V_{rx}$ detected in the last control cycle. If an affirmative decision (YES) is obtained in step M6, it means that the vehicle can be run forward with an increase in the running speed V as a result of the high-μ road engine-assisting control of the MG 28 to drive the rear wheels 34 immediately after the accelerator pedal has been depressed. In this case, the control flow goes to step M7 corresponding to the engine-assisting motor drive inhibiting means 68, to terminate or inhibit the operation of the MG 28 to drive the rear wheels 34. Thus, one cycle of execution of the main routine of FIG. 10 is terminated. The termination of the operation of he MG 28 leads to saving the electric energy.

Figure 13:
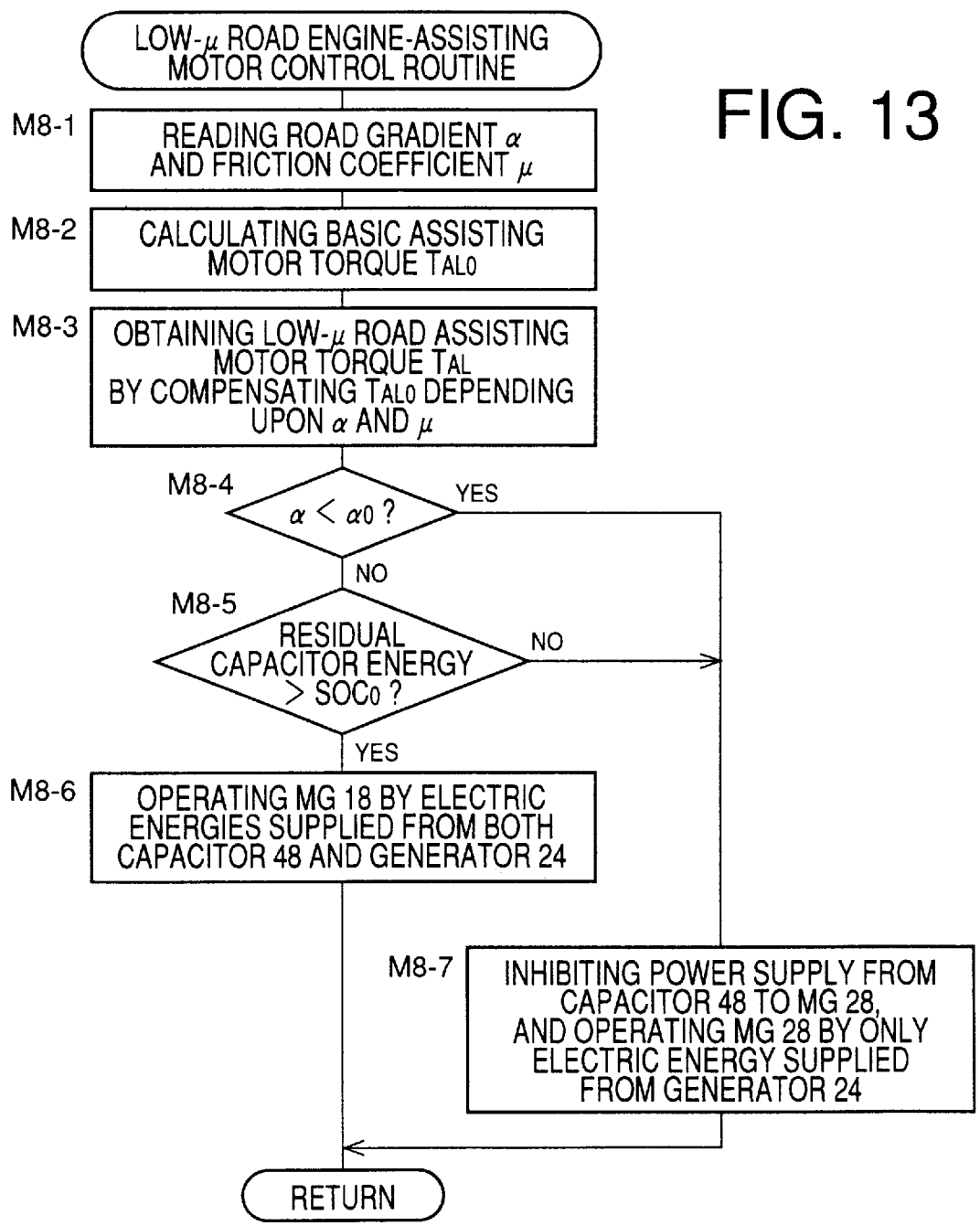
FIG. 13 is a flow chart illustrating a low-$\mu$ road engine-assisting motor control routine executed in step M8 of the main routine of FIG. 10.

If a negative decision (NO) is obtained in step M6, that is, if the vehicle cannot be run forward without driving of the rear wheels 34 by the MG 28, the control flow goes to step M8 corresponding to the low-μ road engine-assisting motor control means 74, to execute the low-μ road engine-assisting motor control routine illustrated in the flow chart of FIG. 13. This control routine is initiated with step M8-1 to read the gradient α and the friction coefficient μ of the road surface. The gradient α is represented by the output signal of the road gradient sensor 52, while the road surface friction coefficient μ can be calculated by the traction control means 60, based on the slip ratio Rs or slip speed ΔV, since the friction coefficient μ has a close relationship with the slip ratio Rs or slip speed ΔV.

Step M8-1 is followed by step M8-2 corresponding to the basic assisting motor torque calculating means 76, to calculate the basic value $T_{AL0}$ of the low-μ road assisting torque $T_{AL}$ on the basis of the accelerator operation amount θ and/or its rate of change dθ/dt, and according to a stored predetermined relationship or relationships between or among the basic value $T_{AL0}$, and the operation amount θ and/or the rate of change dθ/dt, as indicated in the graphs of FIGS. 12A and 12B. These relationships are determined to increase the basic value $T_{AL0}$ with an increase in the operation amount θ and/or the rate of change dθ/dt. Then, the control flow goes to step M8-3 corresponding to the first assisting motor torque compensating means 78 and the second assisting motor torque compensating means 80. In step M8-3, the compensating coefficient K1 is determined on the basis of the detected road surface gradient α and according to a relationship between the coefficient K1 and the gradient α, as indicated in the graph of FIG. 7 by way of example, and the compensating coefficient K2 is determined on the basis of the road surface friction coefficient μ and according to a predetermined relationship between the coefficients K2 and μ, as indicated in the graph of FIG. 8 by way of example. The basic low-μ assisting torque value $T_{AL0}$ is compensated to obtain the target value $T_{AL1}$ by multiplying the basic value $T_{AL0}$ by the determined first and second compensating coefficients K1 and K2. The graph of FIG. 9 indicates the above-indicated relationships used by the compensating means 78, 80 to compensate the basic value $T_{AL0}$ to obtain the low-μ road assisting motor torque $T_{AL}$, more precisely, the target value $T_{AL1}$.

Step M8-3 is followed by step M8-4 corresponding to the non-ascending slope determining means 88, to determine whether the detected road surface gradient α is lower than the predetermined threshold α0. If an affirmative decision (YES) is obtained in step M8-4, it means that the road surface is a flat road surface and that the low-μ road assisting torque $T_{AL}$ need not be rapidly increased. In this case, the control flow goes to step M8-7 corresponding to the electric power source switching means 86, wherein the supply of the electric energy from the capacitor 48 to the MG 28 is inhibited to inhibit the concurrent supplies of the electric energies from the capacitor 41 and the generator 24 to the MG 28, so that the MG is operated by only the electric energy supplied from the generator 24, to provide the target value $T_{AL1}$ of the low-μ road assisting torque $T_{AL}$ which has been calculated in step M8-3. Thus, the road surface is changed from an ascending road surface to a flat road surface during starting of the vehicle, the electric power source for operating the MG 28 to drive the rear wheels 34 is changed from a combination of the generator 24 and the capacitor 48 to only the generator 48.

If a negative decision (NO) is obtained in step M8-4, it means that the road surface is an ascending road surface and that the assisting torque $T_{AL}$ need to be rapidly increased. In this case, the control flow goes to step M8-5 corresponding to the first residual energy amount detecting means 82, to determine whether the electric energy amount SOC stored in the capacitor 48 is larger than the lower limit SOCo. If an affirmative decision (YES) is obtained in step M8-5, the control flow goes to step M8-6 corresponding to the cooperative energy supply means 84, wherein the electric energy is supplied from the capacitor 48 to the MG 28, concurrently with the supply of the electric energy from the generator 24, so that the low-$\mu$ road assisting torque $T_{AL}$ of the MG 28 can be rapidly increased, as indicated in the graphs of FIGS. 6A and 6B, owing to an abrupt increase of amount of the electric energy supplied from the capacitor 48 to the MG 28, making it possible to rapidly increase the driving force applied to the rear wheels 34, for thereby facilitating the starting of the vehicle even on the ascending road surface. If the electric energy stored in the capacitor 48 is substantially exhausted as a result of the operation of the MG 28 in step M8-6, a negative decision (NO) Is obtained in step M8-5 in the next control cycle. In this case, the control flow goes to step M807 in which the MG 28 is operated by only the electric energy supplied from the generator 24.

Referring back to the main routine of FIG. 10, the low-$\mu$ road engine-assisting motor control routine in step MS (routine of FIG. 13) is followed by steps M9, M10 and M11 which correspond to the engine-assisting motor control terminating means 90. Step M9 is provided to determine whether the slip speed $\Delta V$ is lower than the predetermined threshold $\Delta V_1$. Step M10 is provided to determine whether the vehicle running speed V is equal to or higher than the predetermined threshold value V×2. Step M11 is provided to determine whether the accelerator operation amount $\theta$ is zero or equal to a minimum value $\theta$min.

If a negative decision (NO) is obtained in all of steps M9, M10 and M11, the low-$\mu$ road engine-assisting control of the MG 28 should be continued. In this case, the control flow goes to step M12 to set the flag F1 to "1", and goes back to step M1 to repeat the main routine. If an affirmative decision (YES) is obtained in one of steps M9 and M10, the control flow goes to step M13 corresponding to the low-$\mu$ road engine-assisting motor control terminating means 92, to execute a low-$\mu$ road engine-assisting motor control terminating routine. If an affirmative decision (YES) is obtained in step M11, the control flow goes to step M14, which is implemented following step M13.

Figure 14:
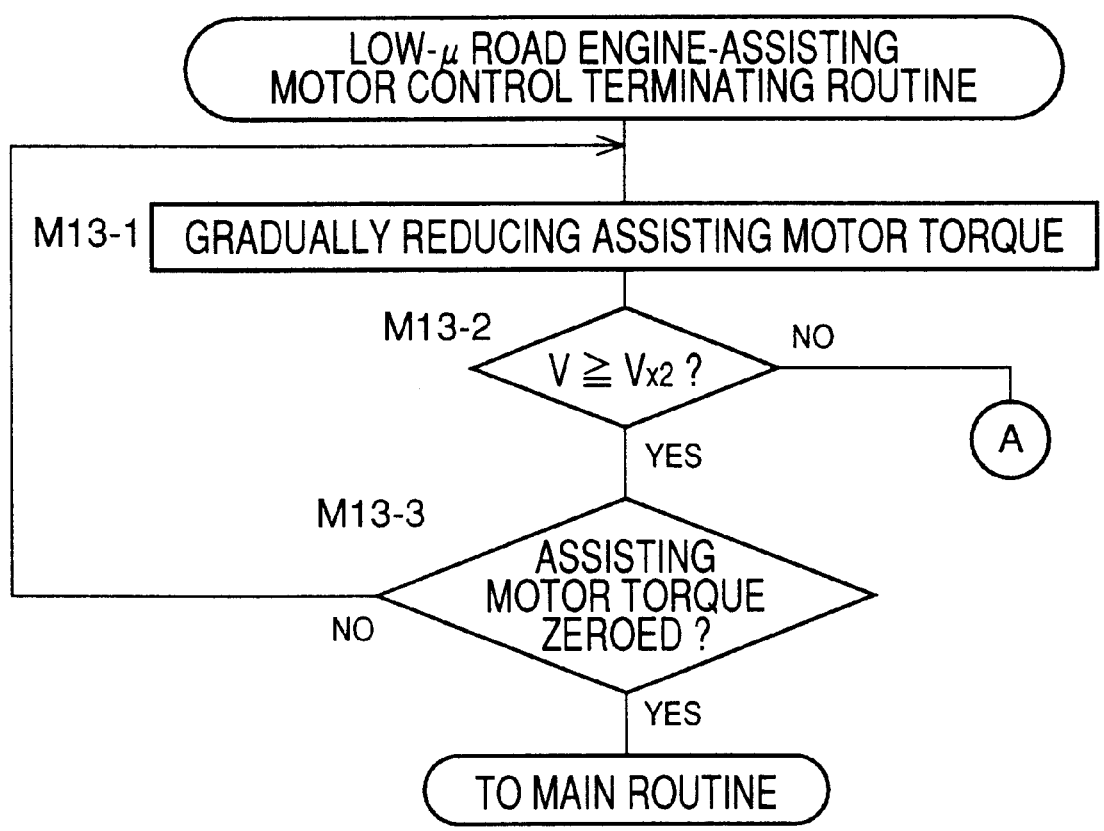
FIG. 14 is a flow chart illustrating a low-m road engine-assisting motor control terminating routine executed in step M13 of the main routine of FIG. 10.

An example of the low-m road engine-assisting motor control terminating routine executed in step S13 is illustrated in the flow chart of FIG. 14. This routine of 20 FIG. 14 is initiated with step M13-1 corresponding to the assisting motor torque gradually reducing means 96, to gradually reduce the low-$\mu$ road assisting torque $T_{AL}$ of the MG 28, at a comparatively low rate. Step M13-1 is followed by step M13-2 corresponding to the vehicle speed detecting 25 means 94, to determine whether the vehicle speed V is equal to or higher than the threshold V×2. If a negative decision (NO) is obtained in step M13-2, that is, if the vehicle speed V is lower than the threshold V×2, assisting torque $T_{AL}$ of the MG 28 should not be reduced in order to permit smooth forward running of the vehicle. In this case, therefore, the low-$\mu$ road engine-assisting motor control terminating routine of FIG. 14 is terminated, and the control flow goes to step M8 to execute again the low-$\mu$ road engine-assisting motor control routine, and the subsequent steps. If an affirmative decision (YES) is obtained in step M13-2, the control flow goes to step M13-3 to determine whether the low-$\mu$ road assisting torque $T_{AL}$ has been reduced to zero (as a result of repeated implementation of step M13-1). Initially, a negative decision (NO) is obtained in step M13-3, and the control flow goes back to step M13-1. Thus, step M13-1 is repeatedly implemented until the assisting torque $T_{AL}$ has been reduced to zero, as long as the vehicle speed V is held equal to or higher than the threshold V×2 even with the gradual reduction of the assisting torque $T_{AL}$.

Referring back to the main routine of FIG. 10, the low-$\mu$ road engine-assisting motor control terminating routine in step M13 is followed by step M14 corresponding to the second residual energy amount detecting means 100, to determine whether the electric energy amount SOC stored in the capacitor 48 is larger than the lower limit SOCo. If a negative decision (NO) is obtained in step step M14, the control flow goes to step M15 corresponding to the capacitor charging means 102, to charge the capacitor 48 with the electric energy generated by the generator 24, so that the MG 28 can be operated by the electric energy supplied from the capacitor 48 when the low-$\mu$ road engine-assisting motor control routine in step M8 is executed again. The dashed line at the fall of the low-$\mu$ road assisting torque $T_{AL}$ indicated in the graph of FIG. 6B shows the operation of the generator 24 for an additional time to charge the capacitor 48. The charging of the capacitor in step M15 permits a rapid rise of the engine-assisting torque $T_{AL}$ of the MG 28 to drive the rear wheels 34, when the front wheels 20 have been placed in an excessively slipping state after the vehicle is once smoothly started owing to the execution of the low-$\mu$ road engine-assisting motor control routine.

If an affirmative decision (YES) is obtained in step M14, that is, if the electric energy amount SOC stored in the capacitor 48 is larger than the lower limit SOCo, or has exceeded the lower limit SOCo as a result of the charging in step M15, the control flow goes to step M16 to inhibit or terminate the charging of the capacitor 48 by operation of the generator 24.

Figure 15:
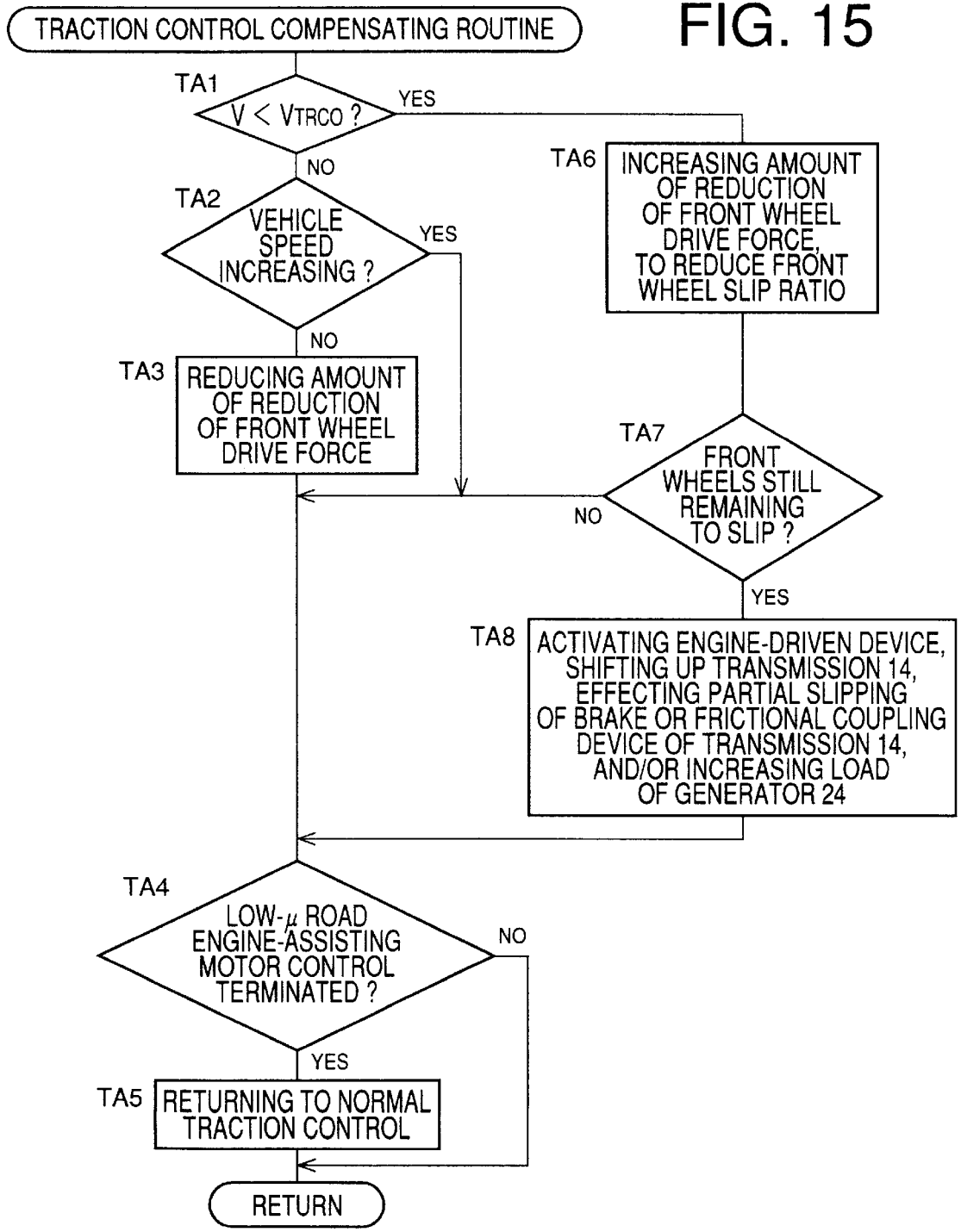
FIG. 15 is a flow chart illustrating a traction control compensating routine executed by the electronic motor control device shown in FIG. 1.

The traction control compensating means 106 executes a traction control compensating routine illustrated in the flow chart of FIG. 15, for optimizing the traction control of the front wheels 20 during an operation of the traction control means 60 and an operation of the low-$\mu$ road engine-assisting motor control means 74. The traction control compensating routine of FIG. 15 is initiated with step TA1 corresponding to the traction control effect monitoring means 108, to determine whether the vehicle speed V is lower than the threshold $V_{TRCO}$. The threshold $V_{TRCO}$ is an experimentally determined value above which the forward running speed V of the vehicle is expected to be raised if the traction control of the front wheels 20 by the traction control means 60 is effectively implemented so as to increase the friction coefficient of the front wheels 20 with respect to the road surface.

If a negative decision (NO) is obtained in step TA1, it means that the traction control by the traction control means 60 is effective. In this case, the control flow goes to step TA2 corresponding to the vehicle speed change monitoring means 110, to determine whether the vehicle speed V is being increased. This determination may be made by determining whether the vehicle speed $V_{tx+1}$ detected in the present control cycle is higher than the vehicle speed $V_{tx}$ detected in the last control cycle. If a affirmative decision (NO) is obtained in step TA2, it means that while the vehicle speed V has been raised to the threshold $V_{TRCO}$ or higher owing to the effective traction control, the vehicle speed V is not in the process of being increased. In this case, the control flow goes to step TA3 corresponding to the drive force reduction mitigating means 112, to reduce the amount of reduction of the driving force of the front wheels 20 by the traction control means 60. For example, if the traction control means 50 has reduced the drive force of the front wheels 20 by activating the front wheel brakes 44, the braking force generated by the front wheel brakes 44 is reduced by a suitable amount, so that the drive force of the front wheels 20 is accordingly increased to increase the running speed V of the vehicle with the aid of an effect provided by the low-$\mu$ road engine-assisting motor control means 74 to operate the MG 28 to drive the rear wheels 34. Step TA3 is followed by step TA4 to determine whether the low-$\mu$ road engine-assisting control of the MG 28 by the low-$\mu$ road engine-assisting motor control means 74 has been terminated. If a negative decision (NO) is obtained in step TA4, one cycle of execution of the traction control compensating routine of FIG. 15 is terminated without implementing step TA5, whereby the modified traction control of the front wheels 20 initiated in step TA3 is continued. If an affirmative decision (YES) is obtained in step TA4, the control flow goes to step TA5 to restore the normal traction control with the originally reduced drive force of the front wheels 20.

If an affirmative decision (YES) is obtained in step TA1, it means that the traction control of the front wheels 20 is not effectively implemented by the traction control means 60, with the vehicle speed V being still extremely low. In this case, the control flow goes to step TA6 corresponding to the drive force reduction intensifying means 114, to increase the amount of reduction of the drive force of the front wheels 20 by the traction control means 60, namely, to further reduce the drive force of the front wheels 20. For instance, the braking force generated by the front wheel brakes 44 is further increased to further reduce the drive force of the front wheels 20, to optimize the traction control so that the amount of slipping of the front wheels 20 immediately after the starting of the vehicle on the road surface having a low friction coefficient $\mu$ can be reduced with a result of an increase in the vehicle running speed V from an extremely low value up to the threshold $V_{TRCO}$.

Step TA6 is followed by step TA7 corresponding to the continuous slip detecting means 116, to determine whether the slipping state of the front wheels 20 continues for more than a predetermined time, even with the increase in the braking force of the front wheel brakes 44. If a negative decision (NO) is obtained in step TA7, it means that the increase in the braking force of the front wheel brakes 44 is effective to reduce the slipping tendency of the front wheels 20. In this case, the control flow goes to the step TA4 indicated above. If an affirmative decision (YES) is obtained in step TA7, it means that the increase in the braking force of the front wheel brakes 44 is not effective. In this case, the control flow goes to step TA8 corresponding to the engine load increasing means 118, to reduce the drive force of the front wheels 20, by increasing the load acting on the engine 10, and/or effecting partial slipping of a brake of the transmission 14 which has been engaged to hold stationary a reaction member of the transmission to establish the presently selected operating position. The engine load may be increased, by at least one of the following methods: activating a non-activated engine-driven device such as the air conditioner, which is operated by the engine 10; maximizing the load of the already activated engine-driven device; shifting up the transmission 14; effecting partial slipping of a frictional coupling device of the transmission 14 which is to be engaged to establish an operating position of the transmission 14 different from the presently established operating position; and increasing the amount of generation of the electric energy by the generator 24. The operation of the drive force reducing means 118 is effective to reduce the amount of slipping of the drive wheels 20 driven by the engine 10.

In the controller constructed according to the present embodiment of the invention for controlling the hybrid 4-wheel-drive automotive vehicle, an electric energy storage device in the form of the capacitor 48 is provided as a second power source for supplying an electric energy to the MG 28, in addition to the electric generator 24 which is operated by the engine 10 and provided as a first power source for operating the MG 28. When the MG 28 is operated to drive the rear wheels 34 to provide an engine assisting drive force for assisting the engine 10 operating to drive the front wheels 20 to start the vehicle, the cooperative energy supply means 84 is operated in step M8-6 to supply an electric energy from the capacitor 48 to the MG 28 concurrently with the supply of an electric energy from the electric generator 24 to the MG 28. This arrangement permits a sufficiently high rate of rise or increase of the engine assisting drive torque of the MG 28 functioning as an electric motor, even with some delay in the rise or increase in the amount of electric energy supplied to the MG 28 from the generator 24 operated by the engine 10. Accordingly, the vehicle can be smoothly started without significant slipping of the front wheels 20 serving as the primary drive wheels.

In the present embodiment, the capacitor 48 is constructed to store an electric energy by polarization of a dielectric material, and has an energy storage capacity sufficient to compensate for an initial shortage of the electric energy to operate the MG 28, which initial shortage would arise from the delayed increase of the electric energy amount supplied from the electric generator 24 to the MG 28 if the MG 28 is operated with only the electric energy supplied from the generator 24. The capacitor 48 of the type indicated above permits a higher rate of rise or increase of the electric energy to be supplied to the MG 28, than an ordinary battery which stores an electric energy electrochemically. Accordingly, the provision of the capacitor 48 assures a further increase in the rate of rise of the engine assisting drive torque of the MG 28.

The controller according to the present embodiment includes the road gradient sensor 52 as a detector for detecting the gradient $\alpha$ of the road surface on which the vehicle is started or run, and electric power source control means in the form of the electric power source switching means 86 which is operated in step M8-7, depending upon the gradient a detected by the gradient sensor 52, to control the ratio of the electric energy amount to be supplied from the capacitor 48 to the MG 28, with respect to the electric energy amount to be supplied from the generator 24 to the MG 28. Described more specifically, the electric power source switching means 86 is adapted to inhibit the supply of the electric energy from the capacitor 48 to the MG 28 when the detected road surface gradient $\alpha$ is lower than the predetermined threshold $\alpha 0$. However, the electric power source control means may be adapted to reduce the above-indicated ratio of the electric energy amount to be supplied from the capacitor 48 to the MG 28, as the detected road surface gradient $\alpha$ is reduced. This arrangement is effective to reduce the amount of consumption of the electric energy stored in the capacitor 48.

The controller of the present embodiment further includes the capacitor charging means 102 which is operated in step M15 immediately after the termination of the engine assisting control of the MG 28, to charge the capacitor 48 with the electric energy generated by the generator 24, depending upon the residual amount SOC of the electric energy stored in the capacitor 48. This arrangement permits a sufficiently high rate of rise of the engine assisting drive torque of the MG 28, even where the engine-assisting control of the MG 28 is repeatedly implemented on the road surface having a relatively low friction coefficient $\mu$.

The controller according to the present embodiment further includes the drive force reducing means 118 which is operated in step TA8, to reduce the drive force of the front wheels 20, if the vehicle running speed V cannot be raised to the predetermined threshold $V_{TRCO}$ due to slipping of the front wheels 20 driven by the engine 10, in spite of an engine-assisting operation of the MG 28. To reduce the drive force of the front wheels 20, the drive force reducing means 118 may include engine load increasing means for increasing the load acting on the engine 10, and/or means for effecting partial slipping of a brake of the transmission 14 which has been engaged to hold stationary a reaction member of the transmission 14 to establish the presently selected operating position. To increase the load acting on the engine 10, the engine load increasing means comprises at least one of: means for activating a non-activated engine-driven device such as the air conditioner, which is operated by the engine 10; means for maximizing the load of the already activated engine-driven device; shifting up the transmission 14; means for effecting partial slipping of a frictional coupling device of the transmission 14 which is to be engaged to establish an operating position of the transmission 14 different from the presently established operating position; and means for increasing the amount of generation of the electric energy by the generator 24. The drive force reducing means 118 is effective to reduce the amount of slipping of the front wheels 20 for thereby increasing the traction force of the vehicle upon starting of the vehicle.

Figure 17:
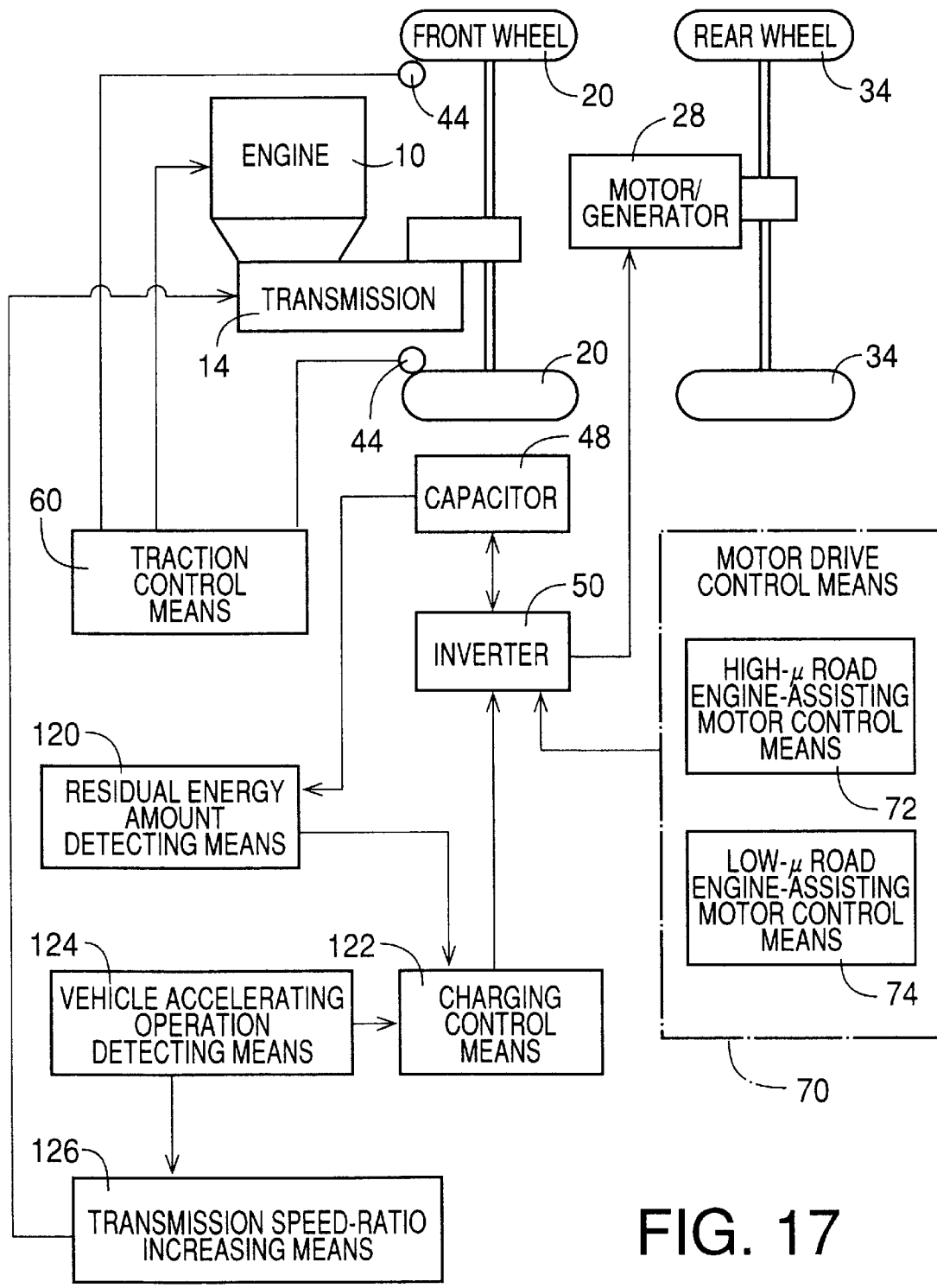
FIG. 17 is a functional block diagram illustrating various control means of an electronic motor control device of a controller constructed according to a second embodiment of this invention.
Figure 18:
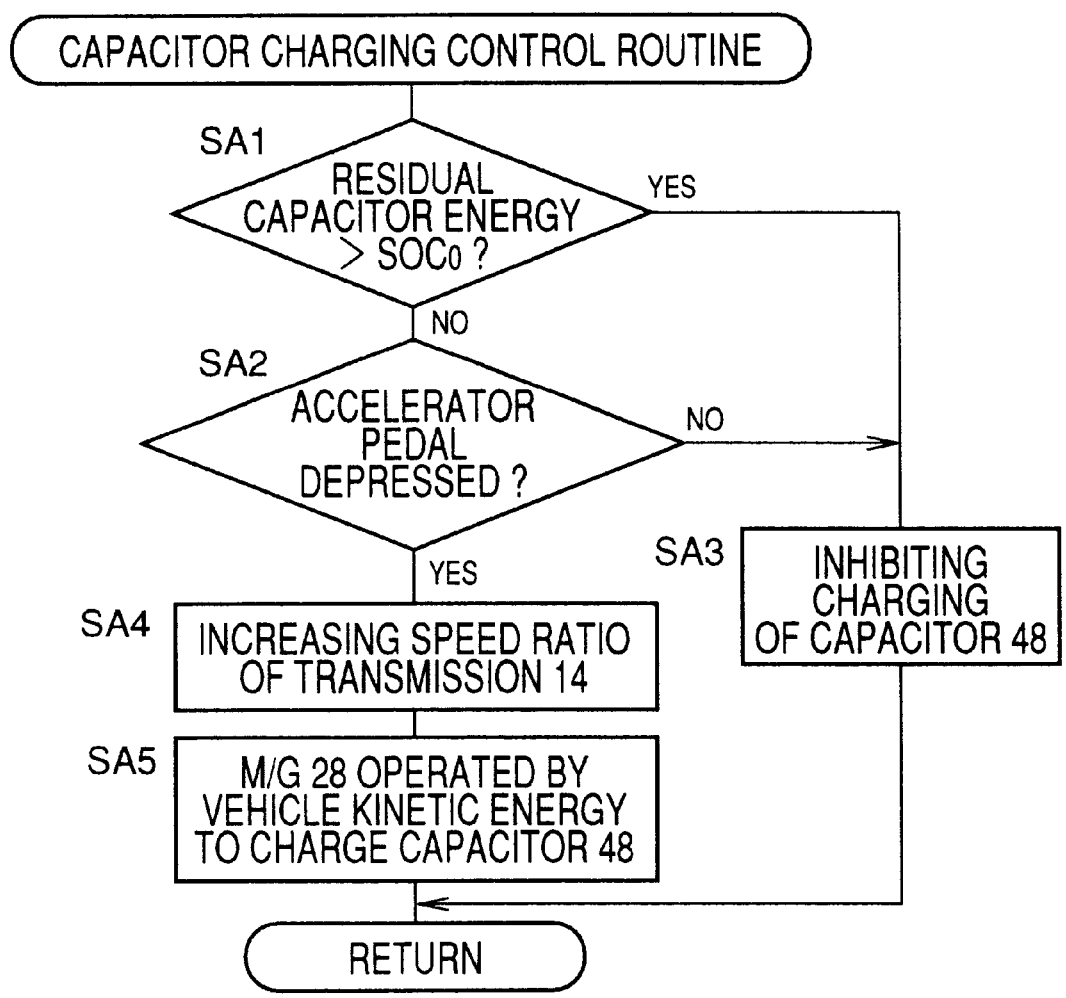
FIG. 18 is a flow chart illustrating a capacitor charging control routine executed by the motor control device of FIG. 17.

Referring next to FIGS. 17 and 18, there will be described a controller according to a second embodiment of the invention for controlling a hybrid 4-wheel-drive automotive vehicle wherein the transmission 14 is an automatic transmission. The motor control device 46 provided in the controller of this second embodiment also includes the motor drive control means 70. As shown in FIG. 17, the motor drive control means 70 includes the high-$\mu$ road engine-assisting motor control means 72 and the low-$\mu$ road engine-assisting motor control means 74, as provided in the first embodiment illustrated in FIG. 4. However, the motor control device 46 is not adapted to implement steps M14–M16 of the main routine of FIG. 10, which are implemented in the first embodiment to charge the capacitor 48 by operation of the electric generator 24 if the residual electric energy amount SOC stored in the capacitor 48 after the low-$\mu$ road engine-assisting operation of the MG 28 is not larger than the predetermined threshold SOCo.

The motor control device 46 according to the second embodiment includes residual energy amount detecting means 120 operated during the high-$\mu$ or low-$\mu$ road engine-assisting control of the MG 28 (second drive power source), for determining whether the residual electric energy amount SOC stored in an electric energy storage device in the form of the capacitor 48 is larger than the predetermined lower limit SOCo, which is experimentally determined such that the electric energy amount SOC larger than the lower limit SOCo is sufficient to perform one engine-assisting operation of the MG 28. The motor control device 46 further includes charging control means 122 which is operated when the residual electric energy amount detecting means 120 determines that the residual electric energy SOC is not larger than the lower limit SOCo. The charging control means 122 is adapted to charge the capacitor 48 with an electric energy generated by the MG 28 which is operated with a kinetic energy of the vehicle during non-decelerating running of the vehicle with the accelerator pedal being depressed.

The motor control device 46 of the controller according to the second embodiment further includes vehicle accelerating operation detecting means 124 whether an operation to accelerate the vehicle has been performed by the vehicle operator to accelerate the vehicle, more specifically, whether the accelerator pedal has been depressed by the vehicle operator. This determination by the vehicle accelerating operation detecting means 124 is effected by determining whether the accelerator operation amount $\theta_{tx+1}$ detected in the present control cycle is larger than the accelerator operation amount $\theta_{tx}$ detected in the last control cycle. The motor control device 46 further includes transmission speed-ratio increasing means 126 which is operated when the residual energy amount detecting means 120 determines that the residual energy amount SOC is not larger than the lower limit SOCo and when the vehicle accelerating operation detecting means 124 determines that the vehicle accelerating operation has been performed. The transmission shift-down means 126 is adapted to increase a speed ratio $\gamma$ of the automatic transmission 14 disposed between the first drive power source in the form of the engine 10 and the primary wheels in the form of the front wheels 20 driven by the first drive power source. The speed ratio $\gamma$ of the automatic transmission 14 is a ratio of the rotating speed Nin of the input shaft of the transmission to the rotating speed Nout of the output shaft of the transmission. Where the automatic transmission 14 has a plurality of operating positions having respective different speed ratios Nin/Nout, the transmission speed-ratio increasing means 126 may be adapted to shift-down the automatic transmission 14 by one position. Where the automatic transmission 14 is a continuously variable transmission (CVT), the transmission speed-ratio increasing means 126 may be adapted to increase the speed ratio $\gamma$ of the CVT by a suitable amount so as to increase a target value $N_E^*$ of the engine speed $N_E$.

The motor control device 46 in the second embodiment is adapted to execute a capacitor charging control routine illustrated in the flow chart of FIG. 18, while the engine-assisting control of the MG 28 is being implemented. The capacitor charging control routine of FIG. 18 is initiated with step SA1 corresponding to the residual energy amount detecting means 120, to determine whether the residual electric energy amount SOC stored in the capacitor 48 is larger than the lower limit SOCo. If an affirmative decision (YES) is obtained in step SA1, it means that the capacitor 48 need not be charged. In this case, the control flow goes to step SA3 corresponding to the charging control means 122, to inhibit or terminate the charging of the capacitor 48 by the MG 28. If a negative decision (NO) is obtained in step SA1, it means that the capacitor 48 need to be charged. In this case, the control flow first goes to step SA2 corresponding to the vehicle accelerating operation detecting means 124, to determine whether the operation to accelerate the vehicle has been performed by the vehicle operator, that is, whether the acceleration operation amount $\theta$ has been increased.

If a negative decision (NO) is obtained in step SA2, the control flow goes to step SA3 to inhibit or terminate the charging of the capacitor 48 by the MG 28. If an affirmative decision (YES) is obtained in step SA2, it means that the vehicle is in the process of acceleration. In this case, the control flow goes to step SA4 corresponding to the transmission speed-ratio increasing means 126, to increase the speed ratio $\gamma$ of the automatic transmission 14 by a suitable amount, so that the engine speed $N_E$ is accordingly increased, whereby the output of the engine 10 is increased. Step SA4 is followed by step SA5 corresponding to the charging control means 122, wherein the MG 28 is operated as an electric generator by a surplus kinetic energy of the vehicle under acceleration, which surplus kinetic energy is produced as a result of an increase in the speed ratio $\gamma$ (a shift-down action) of the automatic transmission 14, whereby a regenerative braking torque corresponding to the surplus kinetic energy is generated by the MG 28, and the capacitor 48 is charged with an electric energy generated by the MG 28. The charging of the capacitor 48 in step SA5 is continued until the electric energy amount SOC stored in the capacitor 48 has been increased to the lower limit SOCo.

In the second embodiment of FIGS. 17 and 18, the charging control means 122 is operated in step SA5 to charge the capacitor 48 by operation of the MG 28, when the residual energy amount detecting means 120 determines in step SA1 that the electric energy amount SOC stored in the capacitor 48 is not larger than the lower limit SOCo. That is, the capacitor 48 is charged with an electric energy generated by the MG 28 which is operated as the electric generator with a kinetic energy of the vehicle in a non-decelerating running state. Thus, as long as the residual electric energy amount SOC stored in the capacitor 48 is not larger than the lower limit SOCo, the capacitor 48 is charged with an electric energy generated by conversion of a kinetic energy of the vehicle, even while the vehicle is not in the process of deceleration, that is, even while the vehicle is running at a substantially constant speed or in the process of acceleration. This arrangement is effective to assure a sufficient amount of electric energy stored in the capacitor 48 before the MG 28 is operated as the electric motor to provide an engine assisting torque for driving the rear wheels 34. In other words, the present arrangement is effective to prevent a shortage of the electric energy for effecting the engine-assisting operation of the MG 28.

Further, the vehicle accelerating operation detecting means 124 is operated in step SA2 to determine whether an operation to accelerate the vehicle has been performed by the vehicle operator. The charging control means 122 is operated only when the residual energy amount detecting means 120 determines that the residual amount of electric energy stored in the capacitor 48 is larger than the lower limit, and when the vehicle accelerating operation detecting means 124 determines that an operation to accelerate the vehicle has been performed by the vehicle operator. Accordingly, the capacitor 48 is charged with an electric energy generated by the MG 28 operated with a portion of a vehicle driving force which has been increased by the operation to accelerate the vehicle. Since the vehicle is accelerated, the operation of the MG 28 to charge the capacitor 48 will not cause the vehicle operator to feel an appreciable drop of the vehicle driving force.

In the second embodiment wherein the automatic transmission 14 is disposed between the engine 10 and the front wheels 20, the transmission speed-ratio increasing means 126 is operated in step SA4 to increase the speed ratio γ of the automatic transmission 14, when the vehicle accelerating operation detecting means 124 determines in step SA2 that the vehicle accelerating operation has been performed by the vehicle operator. An increase in the speed ratio γ of the automatic transmission will provide a surplus vehicle driving torque, so that the amount of the kinetic energy of the vehicle that can be used to charge the capacitor 48 is increased. Accordingly, the operation of the MG 28 to charge the capacitor 48 will not cause the vehicle operator to feel an appreciable drop of the vehicle driving force.

Figure 19:
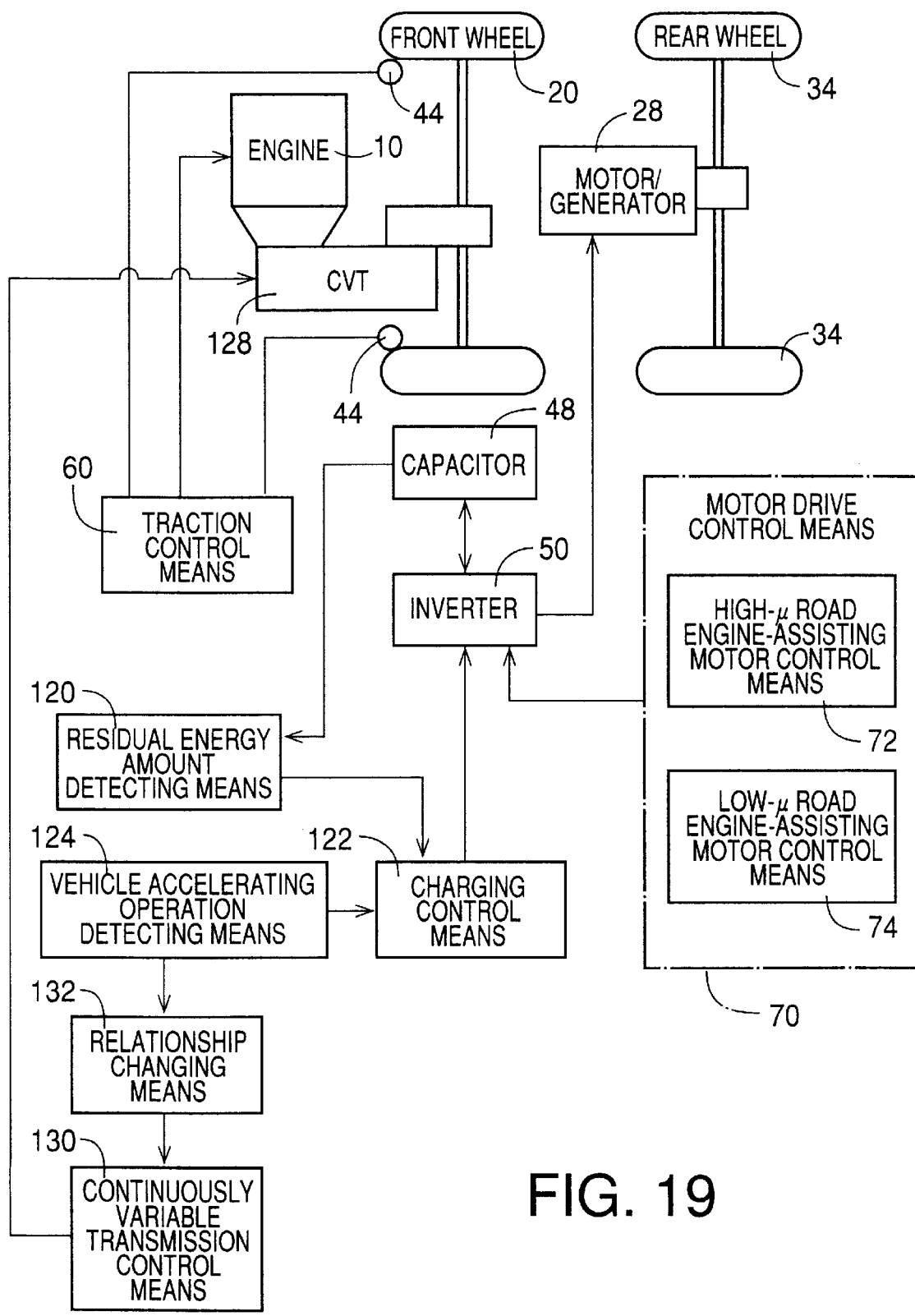
FIG. 19 is a functional block diagram illustrating various control means of an electronic motor control device of a controller constructed according to a third embodiment of this invention.
Figure 20:
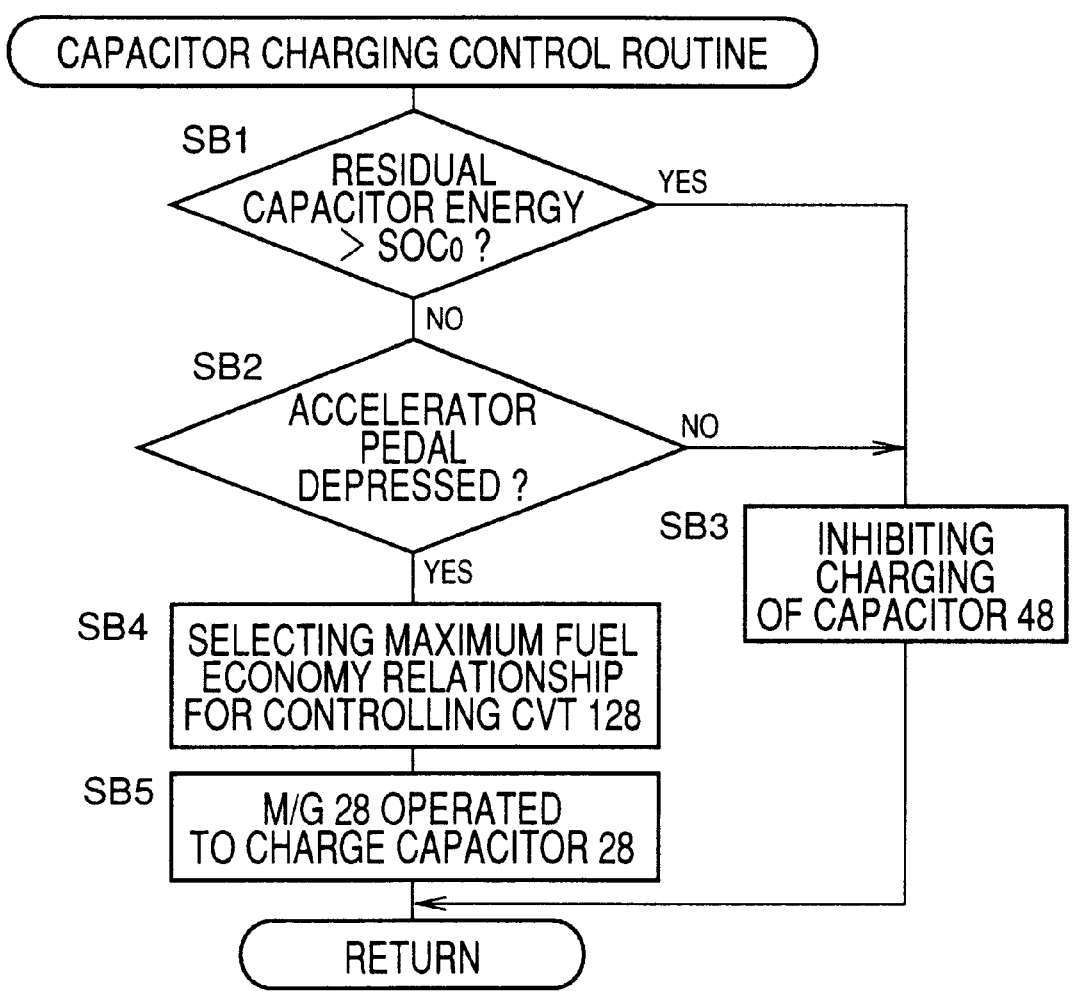
FIG. 20 is a flow chart illustrating a capacitor charging control routine executed by the motor control device of FIG. 19.

Referring to FIGS. 19 and 20, there will be described a third embodiment of the present invention, which is different from the second embodiment of FIGS. 17 and 18, only in that an automatic belt-and-pulley type continuously variable transmission (CVT) 128 is provided in the third embodiment in place of the automatic transmission 14 provided in the second embodiment, and in that continuously variable transmission control means 130 and relationship changing means 132 are provided in the third embodiment, in place of the transmission speed-ratio increasing means 126 provided in the second embodiment.

The continuously variable transmission control means 130 (hereinafter referred to as "CVT control means 130") is adapted to determine a target speed $N_E^*$ of the engine 10 on the basis of the detected vehicle running speed V and accelerator operation amount θ, and according to a stored predetermined target determining relationship among the target speed $N_E^*$ of the engine 10, vehicle running speed V and accelerator operation amount θ, and control the speed ratio γ of the continuously variable transmission 128 (hereinafter referred to as "CVT 128") continuously, so that the actual speed $N_E$ of the engine 10 coincides with the determined target engine speed $N_E^*$. The relationship changing means 132 is operated when the vehicle accelerating operation detecting means 124 determines that the accelerating operation has been performed by the operator of the vehicle. The relationship changing means 132 changes the target determining relationship used by the CVT control means 130, such that the engine 10 is operated for maximum fuel economy of the engine 10 when the target engine speed $N_E^*$ is determined according to the changed relationship. Normally, the CVT control means 130 determines the target engine speed $N_E^*$ according to a selected one of a plurality of target determining relationships having different fuel consumption and drivability characteristics of the vehicle. One of these target determining relationships is either automatically or manually selected. When the accelerator pedal is depressed by the vehicle operator to accelerate the vehicle, the relationship changing means 132 changes the currently selected target determining relationship to a maximum fuel economy relationship other than the above-indicated normally used target determining relationship. When the speed ratio γ of the CVT 128 is controlled by the CVT control means 130 so that the engine speed $N_E$ coincides with the target engine speed $N_E^*$ which is determined according to the maximum fuel economy relationship, the engine 10 is operated such that the output torque $T_E$ and speed $N_E$ of the engine 10 change along a maximum fuel economy curve in a two-dimensional coordinate system wherein the output torque $T_E$ and the speed $N_E$ are taken along the respective two axes.

The motor control device 46 in the third embodiment is adapted to execute a capacitor charging control routine illustrated in the flow chart of FIG. 20, while the engine-assisting control of the MG 28 is being implemented. The capacitor charging control routine of FIG. 20 is initiated with step SB1 corresponding to the residual energy amount detecting means 120, to determine whether the residual electric energy amount SOC stored in the capacitor 48 is larger than the lower limit SOCo, as in step SA1. If an affirmative decision (YES) is obtained in step SB1, it means that the capacitor 48 need not be charged. In this case, the control flow goes to step SB3 corresponding to the charging control means 122, to inhibit or terminate the charging of the capacitor 48 by the MG 28, as in step SA3. If a negative decision (NO) is obtained in step SB1, it means that the capacitor 48 need to be charged. In this case, the control flow first goes to step SB2 corresponding to the vehicle accelerating operation detecting means 124, to determine whether the operation to accelerate the vehicle has been performed by the vehicle operator, that is, whether the acceleration operation amount e has been increased, as in step SA2.

If a negative decision (NO) is obtained in step SB2, the control flow goes to step SB3 to inhibit or terminate the charging of the capacitor 48 by the MG 28. If an affirmative decision (YES) is obtained in step SB2, it means that the vehicle is in the process of acceleration. In this case, the control flow goes to step SB4 corresponding to the relationship changing means 132, to change the currently selected target determining relationship to the maximum fuel economy relationship, so that the target engine speed $N_E^*$ is determined by the CVT control means 130 according to the maximum fuel economy relationship, and so that the CVT 128 is controlled by the CVT control means 130 so that the actual engine speed $N_E$ coincides with the thus determined target value $N_E^*$. Accordingly, the engine 10 is operated so as to assure maximum fuel economy. Step SB4 is followed by step SB5 corresponding to the charging control means 122, in which the MG 28 is operated with a kinetic energy of the vehicle under acceleration, to charge the capacitor 48. The charging of the capacitor 48 is continued until the electric energy amount SOC stored in the capacitor 48 has been increased to the lower limit SOCo.

Like the second embodiment, the present third embodiment of FIGS. 19 and 20 is adapted such that the charging control means 122 is operated in step SB5 to charge the capacitor 48 by operation of the MG 28, when the residual energy amount detecting means 120 determines in step SB1 that the electric energy amount SOC stored in the capacitor 48 is not larger than the lower limit SOCo. That is, the capacitor 48 is charged with an electric energy generated by the MG 28 which is operated with a kinetic energy of the vehicle in a non-decelerating running state. Thus, as long as the residual electric energy amount SOC stored in the capacitor 48 is not larger than the lower limit SOCo, the capacitor 48 is charged with an electric energy generated by conversion of a kinetic energy of the vehicle, even while the vehicle is not in the process of deceleration. This arrangement is effective to assure a sufficient amount of electric energy stored in the capacitor 48 before the MG 28 is operated as the electric motor to provide an engine assisting torque for driving the rear wheels 34. Accordingly, the present arrangement is effective to prevent a shortage of the electric energy for effecting the engine-assisting operation of the MG 28.

Further, the speed ratio γ of the CVT 128 is continuously changed by the CVT control means 130 so that the actual engine speed $N_E$ coincides with the target value $N_E^*$ which is normally determined based on the actual vehicle running speed V and accelerator operation amount θ and according to the selected target determining relationship among those parameters γ, V and θ. When the vehicle accelerating operation detecting means 124 determines in step SB2 that the vehicle accelerating operation has been performed by the vehicle operator, the relationship changing means 132 changes in step SB4 the currently selected target determining relationship to the maximum fuel economy relationship, so that the engine 10 is operated with maximum fuel economy. In this condition, the capacitor 48 is charged with an electric energy generated by conversion of a kinetic energy of the vehicle. Accordingly, the fuel economy of the vehicle is improved.

Figure 21:
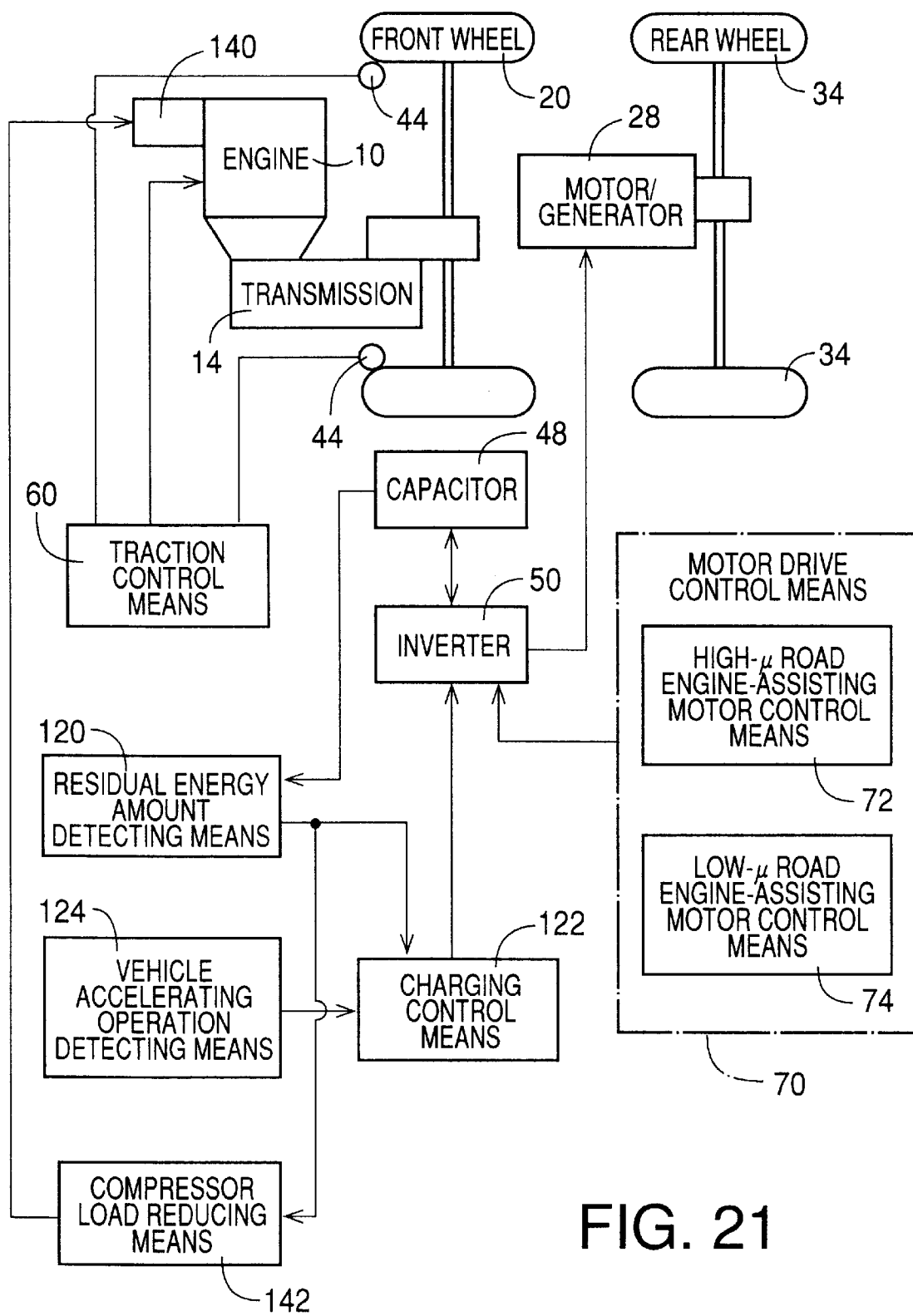
FIG. 21 is a functional block diagram illustrating various control means of an electronic motor control device of a controller constructed according to a fourth embodiment of this invention.

Referring next to FIGS. 21 and 22, there will be described a fourth embodiment of this invention, which is different from the second embodiment of FIGS. 17 and 18 in that a compressor 140 for an air conditioner is connected to the engine 10, as an engine-driven device operated by the engine 10, in the fourth embodiment, and further in that compressor load reducing means 142 for reducing a load acting on the compressor 140 is provided, as load reducing means for reducing a load acting on the engine-driven device, in the fourth embodiment, in pace of the transmission speed-ratio increasing means 126 provided in the second embodiment.

The compressor load reducing means 142 is operated to reduce the load of the compressor 140, when the residual amount SOC of electric energy stored in the capacitor 48 is not larger than the lower limit SOCo. For instance, the compressor load reducing means 142 is adapted to reduce the load of the compressor 140 to a predetermined value, for example, a 50% value of its full load capacity. However, the compressor load reducing means 142 may be adapted to turn off the compressor 140.

The motor control device 46 in the fourth embodiment is adapted to execute a capacitor charging control routine illustrated in the flow chart of FIG. 22, while the engine-assisting control of the MG 28 is being implemented. The capacitor charging control routine of FIG. 22 is initiated with step SC1 corresponding to the residual energy amount detecting means 120, to determine whether the residual electric energy amount SOC stored in the capacitor 48 is larger than the lower limit SOCo, as in step SA1. If an affirmative decision (YES) is obtained in step SC1, it means that the capacitor 48 need not be charged. In this case, the control flow goes to step SC2 corresponding to the charging control means 122, to inhibit or terminate the charging of the capacitor 48 by the MG 28, as in step SA3. If a negative decision (NO) is obtained in step SC1, it means that the capacitor 48 need to be charged. In this case, the control flow first goes to step SC3 corresponding to the compressor load reducing means 140, to reduce the load acting on the compressor 140 for the air conditioner. Step SC3 is followed by step SC4 corresponding to the charging control means 122, wherein the MG 28 is operated with a kinetic energy of the vehicle under acceleration, to charge the capacitor 48. The amount of the kinetic energy used to charge the capacitor 48 by regenerative braking operation of the MG 28 corresponds to the amount of reduction of the load of the compressor 40. The charging of the capacitor 48 is continued until the electric energy amount SOC stored in the capacitor 48 has been increased to the lower limit SOCo.

Like the second and third embodiments, the present fourth embodiment of FIGS. 21 and 22 is adapted such that the charging control means 122 is operated in step SC4 to charge the capacitor 48 by operation of the MG 28, when the residual energy amount detecting means 120 determines in step SC1 that the electric energy amount SOC stored in the capacitor 48 is not larger than the lower limit SOCo. That is, the capacitor 48 is charged with an electric energy generated by the MG 28 which is operated with a kinetic energy of the vehicle in a non-decelerating running state. Thus, as long as the residual electric energy amount SOC stored in the capacitor 48 is not larger than the lower limit SOCo, the capacitor 48 is charged with an electric energy generated by conversion of a kinetic energy of the vehicle, even while the vehicle is not in the process of deceleration. This arrangement is effective to assure a sufficient amount of electric energy stored in the capacitor 48 before the MG 28 is operated as the electric motor to provide an engine assisting torque for driving the rear wheels 34. Accordingly, the present arrangement is effective to prevent a shortage of the electric energy for effecting the engine-assisting operation of the MG 28.

Further, the fourth embodiment is adapted such that the load acting on the compressor 140 for the air compressor is reduced in step SC3 by the compressor load reducing means 142 when the residual energy amount detecting means 120 determines in step SC1 that the residual electric energy amount SOC stored in the capacitor 48 is not larger than the predetermined lower limit SOCo. A reduction in the load of the compressor 140 operated by the engine 10 will provide a surplus vehicle driving torque, so that the amount of the kinetic energy of the vehicle that can be used by the MG 28 for regeneration of an electric energy to charge the capacitor 48 is increased. Accordingly, the operation of the MG 28 to charge the capacitor 48 will not cause the vehicle operator to feel an appreciable drop of the vehicle driving force.

Further, the charging control means 122 is adapted to charge the capacitor 48 such that an amount of electric energy stored in the capacitor 48 corresponds to an amount of reduction of the load of the compressor 140 by the load reducing means 142. Since the amount of surplus vehicle driving torque which is provided by the reduction of the load of the compressor 140 is equal to the amount of electric energy which is generated by the regenerative braking torque of the MG 28 and is stored in the capacitor 48, the vehicle driving force will not be reduced unexpectedly to the vehicle operator, when the electric energy storage device is charged.

While the presently preferred embodiments of the present invention have been described above in detail by reference to the accompanying drawings, for illustrative purpose only, it is to be understood that the present invention may be otherwise embodied.

The controllers according to the illustrated embodiments of the invention are used for the front-and-rear-drive automotive vehicle in the form of the hybrid 4-wheel-drive vehicle wherein the front wheels 20 are driven by the engine 10, as primary drive wheels, and the rear wheels 34 are driven by the MG 28, as auxiliary drive wheels, as needed. However, the controller according to the present invention may be used for a hybrid 4-wheel-drive vehicle wherein the rear wheels 34 are driven by the engine 10, as primary drive wheels, and the front wheels 20 are driven by the MG 28, as auxiliary drive wheels, as needed.

While the illustrated embodiments use, as the electric energy storage device, the capacitor 48 which stores an electric energy by polarization of a dielectric material, a battery or cell which stores an electric energy electrochemically may be used as the electric energy storage device. Such a battery permits a higher rate of rise of the electric energy supplied to the MG 28, and a higher rate of increase of the engine-assisting torque of the MG 28, than the electric generator 24.

The electric generator 24 provided in the illustrated embodiments may be replaced by an electric motor/generator which can also be used as a starter motor for starting the engine 10, and an electric motor for starting the vehicle, as well as an electric generator for generating an electric energy. This motor/generator, which is operated with an electric energy supplied from a suitable battery, may be adapted to operate the compressor for an air conditioner, an oil pump for a power steering device and/or other device, while the vehicle is stationary with the engine 10 being held off.

Although the illustrated embodiments are adapted such that the cooperate energy supply means 84 supplies an electric energy from the capacitor 48 to the MG 28 concurrently with a supply of an electric energy from the electric generator 24 to the MG 28, the supply of the electric energy from the electric generator 24 may be initiated a short time after the supply of the electric energy from the capacitor 48 is initiated.

While the main routine of FIG. 10 in the first embodiment is arranged such that the control flow goes to step M9 when the affirmative decision (YES) is obtained in step M1, the main routine may be modified such that the control flow goes to step M8 when the affirmative decision is obtained in step M1.

In the second, third and fourth embodiments, the engine 10 and the MG 28 may be replaced by other types of drive power source such as a hydraulic motor. Where a hydraulic motor is used for driving the auxiliary drive wheels, the kinetic energy of the vehicle can be converted into a hydraulic pressure of a working fluid which is pressurized by the hydraulic motor and stored in a suitable hydraulic accumulator. Further, a power transmitting device other than that used in the illustrated embodiments may be disposed between the wheels 20, 34 and the drive power sources.

What is claimed is:

1. A controller for controlling a hybrid front-and-rear-drive automotive vehicle including a front wheel and a rear wheel, an engine, an electric generator operated by said engine, and an electric motor operable with an electric energy generated by said electric generator, and wherein one and the other of said front and rear wheels is driven by said engine and said electric motor, respectively, said controller comprising:

an electric energy storage device; and cooperative energy supply means for supplying an electric current from said electric energy storage device to said electric motor, concurrently with a supply of an electric energy from said electric generator to said electric motor, to operate said electric motor for driving said other of said front and rear wheels.

2. A controller according to claim 1, wherein said electric energy storage device includes a capacitor which stores the electric energy by polarization of a dielectric material and which has an energy storage capacity sufficient to compensate for an initial shortage of the electric energy to operate said electric motor, which initial shortage would arise from a delayed increase of an amount of the electric energy supplied from said electric generator to said electric motor, if said electric motor were operated with only the electric energy supplied from said electric generator.

3. A controller according to claim 1, further comprising:

a gradient detector for detecting a gradient of a road surface on which the vehicle lies; and electric power source control means for controlling, depending upon said gradient detected by said gradient detector, a ratio of the amount of electric energy to be supplied from said electric energy storage device to said electric motor, with respect to the amount of electric energy supplied from said electric generator to said electric motor.

4. A controller according to claim 3, wherein said electric power source control means consists of electric power source switching means for zeroing the amount of electric energy to be supplied from said electric energy storage device to said electric motor when said gradient detected by said gradient detector is lower than a predetermined threshold.

5. A controller according to claim 1, further comprising charging means operated immediately after termination of an operation of said electric motor, for charging said electric energy storage device with the electric energy generated by said electric generator, depending upon the amount of electric energy stored in said electric energy storage device immediately after the termination of said operation of said electric motor.

6. A controller according to claim 1, further comprising drive force reducing means for reducing a drive force of said front wheel, if a running speed of the vehicle cannot be raised to a predetermined threshold due to slipping of said front wheel driven by said engine, in spite of an operation of said electric motor.

7. A controller according to claim 6, wherein said drive force reducing means includes engine load increasing means for increasing a load acting on said engine.

8. A controller according to claim 7, wherein the vehicle further includes an automatic transmission through which an output of said engine is transmitted to said one of said front and rear wheels, and said engine load increasing means comprises at least one of: means for activating an engine-driven device which is operated by said engine and which has been held off; means for maximizing a load acting on said engine-driven device which has already been activated; means for shifting up said automatic transmission; means for effecting partial slipping of a friction coupling device of said automatic transmission which is to be engaged to establish an operating position of said automatic transmission different from a presently established operating position thereof; and means for increasing the amount of electric energy generated by said electric generator.

9. A controller according to claim 6, wherein the vehicle further includes an automatic transmission through which an output of said engine is transmitted to said one of said front and rear wheels, and said drive force reducing means includes means for effecting partial slipping of a brake of said automatic transmission which has been engaged to hold stationary a reaction member of said automatic transmission to establish a presently selected operating position thereof.

10. A controller according to claim 1, further comprising:
   residual energy amount detecting means for determining whether a residual amount of electric energy stored in said electric energy storage device is larger than a predetermined lower limit; and
   charging control means operable when said residual energy amount detecting means determines that said residual amount of electric energy is not larger than said predetermined lower limit, for charging said electric energy storage device with an electric energy generated by conversion of a kinetic energy of the vehicle while the vehicle is running in a non-decelerating state.

11. A controller according to claim 10, further comprising vehicle accelerating operation detecting means for determining whether an accelerating operation to accelerate the vehicle has been performed by an operator of the vehicle, and wherein said charging control means is operated to charge said electric energy storage device when said residual energy amount detecting means determines that residual amount of electric energy stored in said electric energy storage device is not larger than said predetermined lower limit, and when said vehicle accelerating operation detecting means determines that the vehicle accelerating operation has been performed by the operator of the vehicle operator.

12. A controller according to claim 11, wherein the vehicle further includes an automatic transmission disposed between said engine and said one of said front and rear wheels, said controller further comprising transmission speed-ratio increasing means for increasing a speed ratio of said automatic transmission when said vehicle accelerating operation detecting means determines that said accelerating operation has been performed by the operator of the vehicle operator, said speed ration being a ratio of an input speed of said automatic transmission to an output speed of said automatic transmission.

13. A controller according to claim 10, wherein the vehicle further includes an automatic continuously variable transmission disposed between said engine and said one of said front and rear wheels, said controller further comprising:
   continuously variable transmission control means for continuously controlling a speed ratio of said continuously variable transmission so that an actual speed of said engine coincides with a target value which is determined on the basis of an actual running speed of the vehicle and a currently required output of said engine, and according to a stored predetermined target determining relationship among said target value, said actual running speed of the vehicle and said currently required output of the engine; and
   relationship changing means operable when said vehicle accelerating operation detecting means determines that said accelerating operation to accelerate the vehicle has been performed by the operator of the vehicle, for changing said stored predetermined target determining relationship to a maximum fuel economy relationship, so that said engine is operated with maximum fuel economy with said speed ratio being continuously controlled so that said actual speed of the engine coincides with said target value determined according to said maximum fuel economy relationship.

14. A controller according to claim 10, wherein the vehicle further includes an engine-driven device driven by said engine, said controller further comprising load reducing means for reducing a load acting on said engine-driven device when said residual energy amount detecting means determines that the residual amount of electric energy stored in said electric energy storage device is not larger than said predetermined lower limit, said charging control means being operated when the load acting on said engine-driven device is reduced by said load reducing means.

15. A controller according to claim 14, wherein said charging control means charges said electric energy storage device such that an amount of electric energy stored in said electric energy storage device corresponds to an amount of reduction of the load of said engine-driven device by said load reducing means.

* * * * *